US012647963B2

(12) United States Patent
Yoon et al.

(10) Patent No.: US 12,647,963 B2
(45) Date of Patent: Jun. 2, 2026

(54) METHOD AND APPARATUS FOR DETERMINING HARQ PROCESS ID IN COMMUNICATION SYSTEM

(71) Applicant: SAMSUNG ELECTRONICS CO., LTD., Suwon-si (KR)

(72) Inventors: Suha Yoon, Suwon-si (KR); Euichang Jung, Suwon-si (KR); Hyunjung Kim, Suwon-si (KR); Seho Myung, Suwon-si (KR); Jeongho Yeo, Suwon-si (KR); Junyung Yi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 258 days.

(21) Appl. No.: 18/452,490

(22) Filed: Aug. 18, 2023

(65) Prior Publication Data

US 2023/0413258 A1      Dec. 21, 2023

Related U.S. Application Data

(63) Continuation of application No. PCT/KR2022/006514, filed on May 6, 2022.

(30) Foreign Application Priority Data

May 20, 2021    (KR) ......................... 10-2021-0065026

(51) Int. Cl.
*H04W 72/11* (2023.01)
*H04L 1/1812* (2023.01)
*H04W 72/1273* (2023.01)

(52) U.S. Cl.
CPC ........... *H04W 72/11* (2023.01); *H04L 1/1812* (2013.01); *H04W 72/1273* (2013.01)

(58) Field of Classification Search
CPC . H04W 72/11; H04W 72/1273; H04W 72/21; H04L 1/1812; H04L 1/1854; H04L 1/1861; H04L 1/1671; H04L 1/1887
See application file for complete search history.

(56) References Cited

U.S. PATENT DOCUMENTS

| | | | |
|---|---|---|---|
| 8,230,291 B2 | 7/2012 | Cai et al. | |
| 9,270,422 B2 | 2/2016 | Yang et al. | |

(Continued)

FOREIGN PATENT DOCUMENTS

| | | |
|---|---|---|
| CN | 108811114 A | 11/2018 |
| CN | 112583527 A | 3/2021 |

(Continued)

OTHER PUBLICATIONS

International Search Report for PCT/KR2022/006514 by Korean Intellectual Property Office dated Aug. 4, 2022.

(Continued)

*Primary Examiner* — Rushil P. Sampat
(74) *Attorney, Agent, or Firm* — NIXON & VANDERHYE P.C.

(57) ABSTRACT

The present disclosure relates to a 5G or 6G communication system for supporting a higher data transmission rate and describes a method that may perform the steps of: receiving, from a base station, configuration information associated with at least one first SPS; receiving, from the base station, an SPS activation signal indicating activation of a second SPS from among the at least one first SPS; identifying, on the basis of configuration information associated with the second SPS, and the SPS activation signal, whether or not, from among at least one PDSCH reception occurrence associated with the second SPS, a first PDSCH reception occurrence includes a plurality of slots; if the first PDSCH reception occurrence includes the plurality of slots, determining one of the plurality of slots as a reference slot; and (Continued)

determining an HARQ process ID on the basis of information regarding the determined reference slot.

12 Claims, 16 Drawing Sheets

(56) References Cited

U.S. PATENT DOCUMENTS

| | | | | |
|---|---|---|---|---|
| 11,115,859 | B2 | 9/2021 | Ahn et al. | |
| 11,190,304 | B2 | 11/2021 | Ai | |
| 2019/0268971 | A1 | 8/2019 | Talarico et al. | |
| 2020/0374748 | A1 | 11/2020 | Ahn et al. | |
| 2021/0051634 | A1* | 2/2021 | Fakoorian | H04W 72/23 |
| 2021/0083806 | A1 | 3/2021 | Zou et al. | |
| 2021/0099257 | A1* | 4/2021 | Joseph | H04W 76/27 |
| 2022/0095337 | A1 | 3/2022 | Wang et al. | |
| 2023/0126768 | A1* | 4/2023 | Wang | H04L 5/0055 |
| | | | | 370/336 |
| 2025/0007653 | A1* | 1/2025 | Yang | H04L 1/1671 |

FOREIGN PATENT DOCUMENTS

| | | | |
|---|---|---|---|
| KR | 10-2020-0004855 A | | 1/2020 |
| KR | 10-2020-0027954 A | | 3/2020 |
| KR | 10-2022-0137486 A | | 10/2022 |
| WO | 2020/197195 A1 | | 10/2020 |
| WO | WO 2022236535 A1 | * | 11/2022 |

OTHER PUBLICATIONS

NTT Docomo, Inc., 'Discussion on HARQ-ACK feedback enhancements for Rel. 17 URLLC', R1-2103574, 3GPP TSG RAN WG1 #104b-e, e-Meeting, Apr. 7, 2021.

Nokia et al., 'PDSCH/PUSCH enhancements', R1-2102562, 3GPP TSG RAN WG1 #104bis-e, e-Meeting, Apr. 6, 2021.

Catt, 'PDSCH/PUSCH enhancements for up to 71GHz operation', R1-2104509, 3GPP TSG RAN WG1 #105e-, e- Meeting, May 12, 2021.

Apple, 'Discussion on HARQ Enhancements for NTN', R1-2101385, 3GPP TSG RAN WG1 #104-e, e-Meeting, Jan. 18, 2021.

\* cited by examiner

FIG. 7
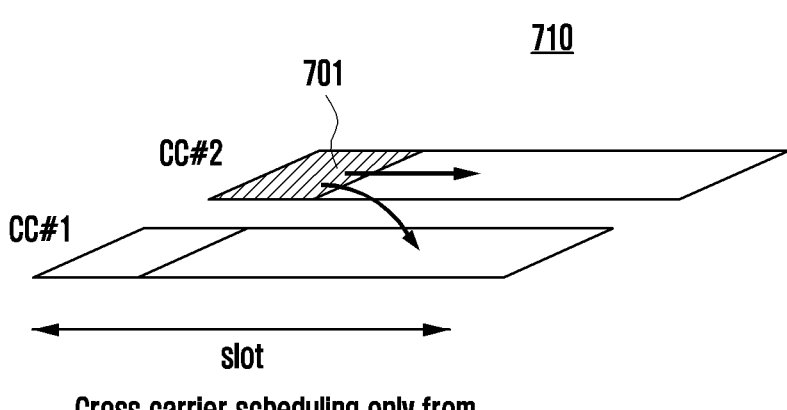
Cross carrier scheduling only from
one component carrier
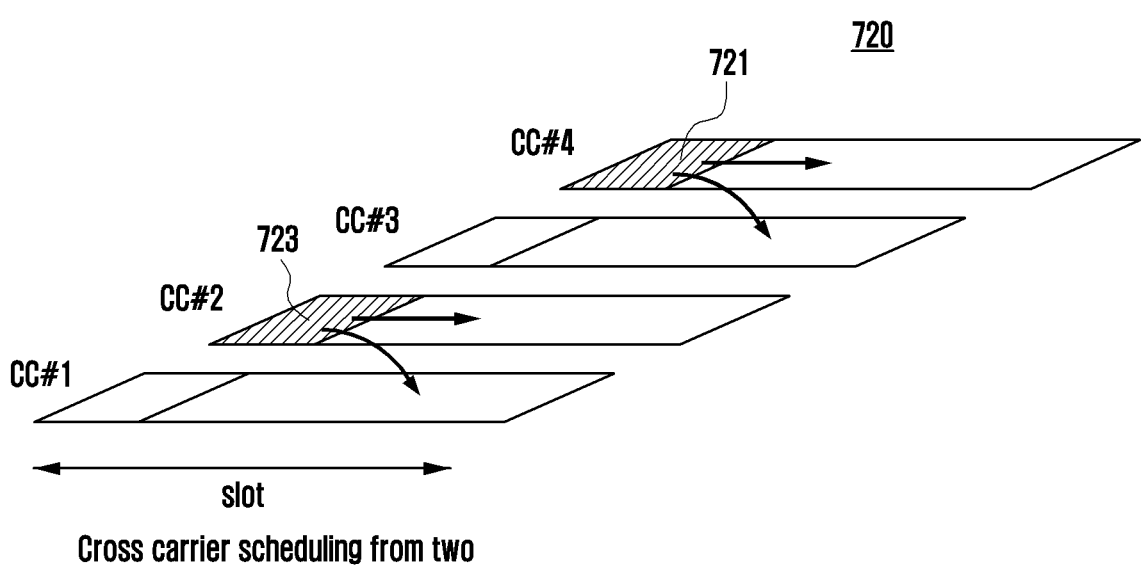
Cross carrier scheduling from two
component carrier FIG. 11
Transport block processing over multi-slot PUSCH(TBoMS):
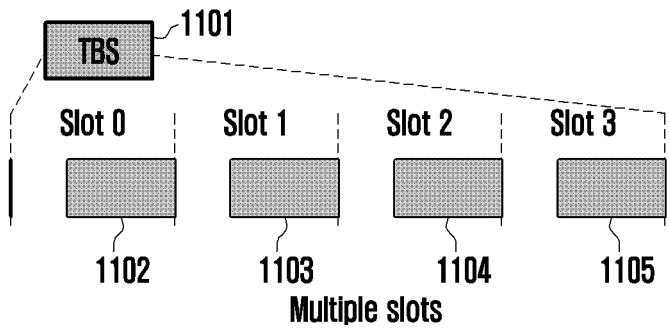
PUSCH repetition type A like TDRA for TBoMS (S=5, L=9, k=4) (1106):
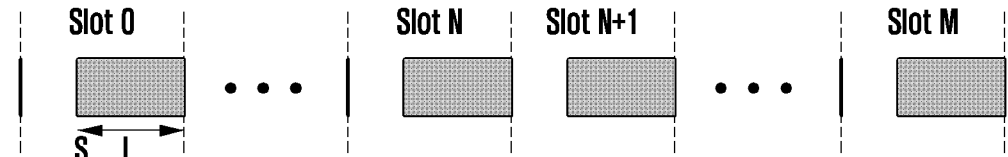
PUSCH repetition type B like TDRA with long symbol L for TBoMS (1107):
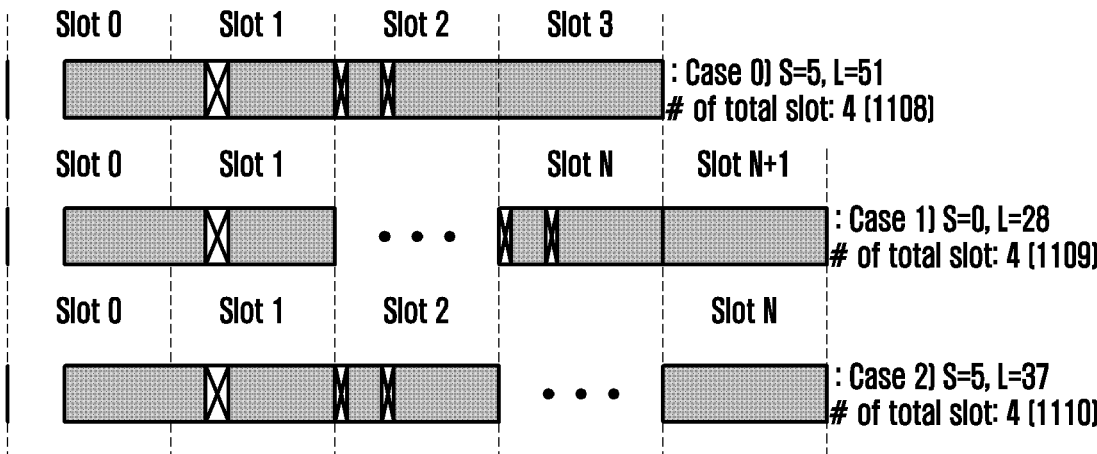

FIG. 14

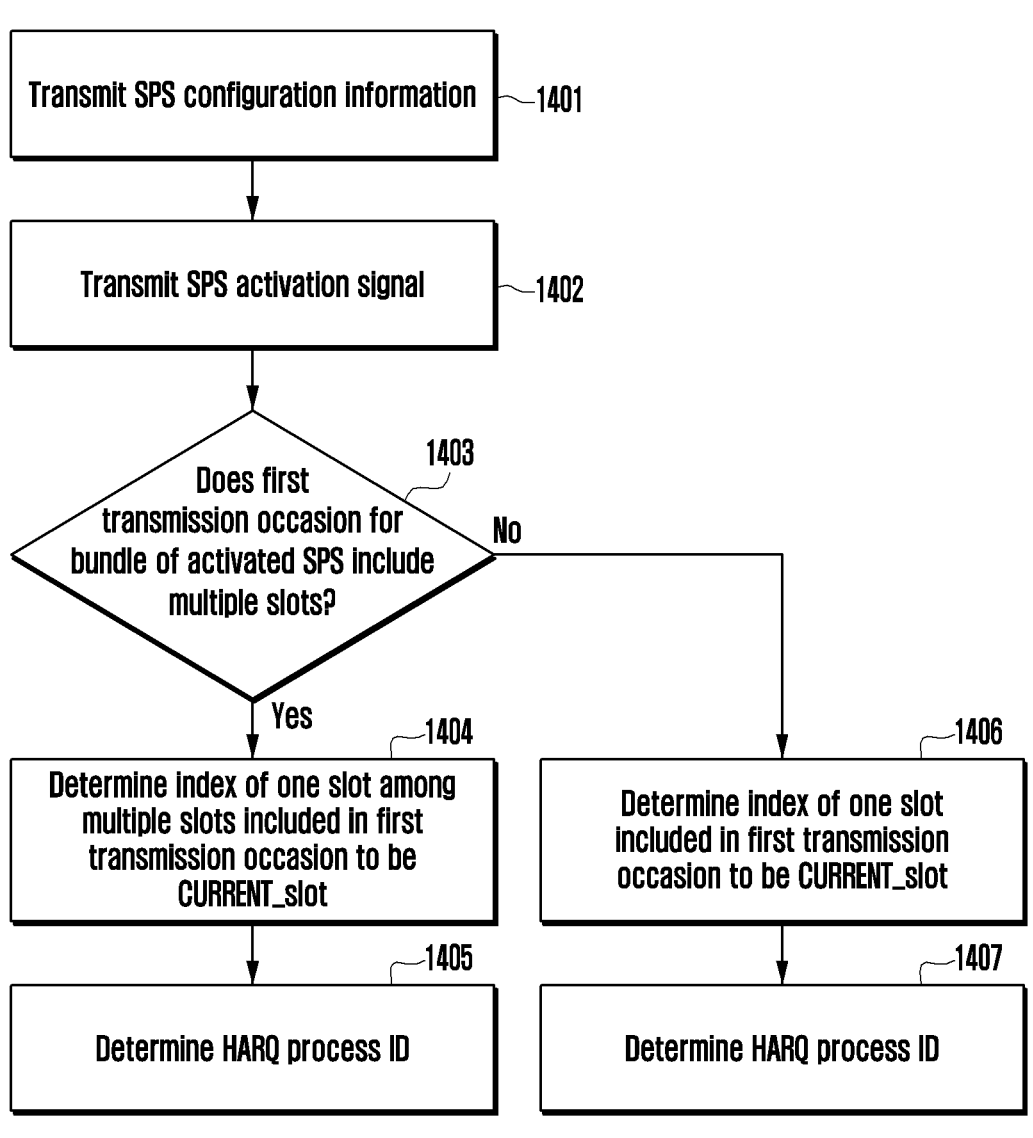

Transmit SPS configuration information —1401

Transmit SPS activation signal —1402

Does first transmission occasion for bundle of activated SPS include multiple slots? 1403

No

Yes

Determine index of one slot among multiple slots included in first transmission occasion to be CURRENT_slot —1404

Determine index of one slot included in first transmission occasion to be CURRENT_slot —1406

Determine HARQ process ID —1405

Determine HARQ process ID —1407

METHOD AND APPARATUS FOR DETERMINING HARQ PROCESS ID IN COMMUNICATION SYSTEM

CROSS REFERENCE TO RELATED APPLICATIONS

This application is a continuation application of International Application No. PCT/KR2022/006514 filed on May 6, 2022, which claims priority from and derives the benefit of Korean Patent Application No. 10-2021-0065026 filed on May 20, 2021, the entire contents of each of these applications is hereby incorporated in their entirety, by reference.

TECHNICAL FIELD

The disclosure relates to operations of a terminal and a base station in a communication system. More specifically, the disclosure relates to a method for, in order to ensure higher reliability in a communication system, determining a hybrid automatic repeat request (HARQ) process identifier (ID) in case that a terminal and a base station perform an HARQ operation for transmission or reception of data (or information), and a device capable of performing same.

BACKGROUND

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz. (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Band-Width Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE

In a communication system as described above, a physical downlink shared channel (PDSCH) is scheduled by downlink control information (DCI), and a terminal may transmit or receive downlink data by receiving data through a scheduled PDSCH. Downlink control information may include information related to a hybrid automatic repeat request (HARQ) process (e.g., an HARQ process number or an HARQ process ID), and an HARQ operation for PDSCH reception may be performed in a corresponding HARQ process.

In case that a PDSCH is not dynamically scheduled by downlink control information as described above, for example, in case that semi-persistent scheduling (SPS) is configured for a terminal and a PDSCH is scheduled accordingly, the terminal does not receive downlink control information that may include information related to an HARQ process. Therefore, the terminal needs to determine an HARQ process ID in order to perform an HARQ operation on the received PDSCH according to a configuration of the corresponding SPS.

Therefore, it is necessary to devise a method for configuring an SPS in a communication system, a method for determining an HARQ process ID used during PDSCH transmission or reception according to an SPS configuration, and a device capable of performing the same.

In order to solve the above task, according to an embodiment of the disclosure, a method of a terminal in a communication system is provided. The method includes: receiving configuration information associated with at least one first semi-persistent scheduling (SPS) from a base station; receiving, from the base station, an SPS activation signal indicating activation of a second SPS among the at least one first SPS; identifying whether a first physical downlink shared channel (PDSCH) reception occurrence among at least one PDSCH reception occurrence associated with the second SPS includes multiple slots, based on configuration information associated with the second SPS and the SPS activation signal; determining one slot among the multiple slots as a reference slot in case that the first PDSCH reception occurrence includes the multiple slots; and determining a hybrid automatic repeat request (HARQ) process identifier (ID), based on information on the determined reference slot.

In addition, according to an embodiment of the disclosure, a method of a base station in a communication system is provided. The method includes: transmitting configuration information associated with at least one first SPS to a terminal; transmitting, to the terminal, an SPS activation signal indicating activation of a second SPS among the at least one first SPS; identifying whether a first PDSCH reception occurrence among at least one PDSCH reception occurrence associated with the second SPS includes multiple slots, based on configuration information associated with the second SPS and the SPS activation signal; determining one slot among the multiple slots as a reference slot, in case that the first PDSCH reception occurrence includes the multiple slots; and determining an HARQ process ID, based on information on the determined reference slot.

In addition, according to an embodiment of the disclosure, a terminal of a communication system is provided. The terminal includes: a transceiver; and a controller which is connected to the transceiver, and configured to receive configuration information associated with at least one first SPS from a base station, receive, from the base station, an SPS activation signal indicating activation of a second SPS among the at least one first SPS, identify, whether a first PDSCH reception occurrence among at least one PDSCH reception occurrence associated with the second SPS includes multiple slots, based on configuration information associated with the second SPS and the SPS activation signal, determine, one slot among the multiple slots as a reference slot in case that the first PDSCH reception occurrence 5 includes the multiple slots, and determine an HARQ process ID, based on information on the determined reference slot.

In addition, according to an embodiment of the disclosure, a base station of a communication system is provided. The base station includes: a transceiver; and a controller which is connected to the transceiver, and configured to transmit configuration information associated with at least one first SPS to a terminal, transmit, to the terminal, an SPS activation signal indicating activation of a second SPS among the at least one first SPS, identify whether a first PDSCH reception occurrence among at least one PDSCH reception occurrence associated with the second SPS includes multiple slots, based on configuration information associated with the second SPS and the SPS activation signal, determine one slot among the multiple slots as a reference slot, in case that the first PDSCH reception occurrence includes the multiple slots, and determine an HARQ process ID, based on information on the determined reference slot.

According to various embodiments of the disclosure, provided are a method for determining an HARQ process ID used to perform an HARQ operation on an SPS PDSCH received according to an SPS configuration in a communication system, and a device capable of performing the same.

According to an embodiment of the disclosure, provided are a method for determining an HARQ process ID used to perform an HARQ operation on an SPS PDSCH configured so that one transport block (TB) is received via multiple slots, and a device capable of performing the same.

According to the above, since a terminal and a base station can determine an HARQ process ID with the same criterion or method, a more accurate HARQ operation can be performed in the terminal and the base station. 30

Advantageous effects obtainable from the disclosure may not be limited to the above-mentioned effects, and other effects which are not mentioned may be clearly understood, through the following descriptions, by those skilled in the art to which the disclosure pertains.

DESCRIPTION OF DRAWINGS

The above and other objects, features, and advantages of the disclosure will be more apparent via the following description of embodiments of the disclosure with reference to the accompanying drawings.

FIG. 7 is a diagram illustrating an example of a cross-carrier scheduling method according to an embodiment of the disclosure;

FIG. 11 is a diagram illustrating an example of a method in which one TB is transmitted over multiple slots (TB processing over multi-slot (TBoMS)) in the communication system according to an embodiment of the disclosure;

FIG. 14 is a diagram illustrating an operation of a base station according to an embodiment of the disclosure;

Figure 1:
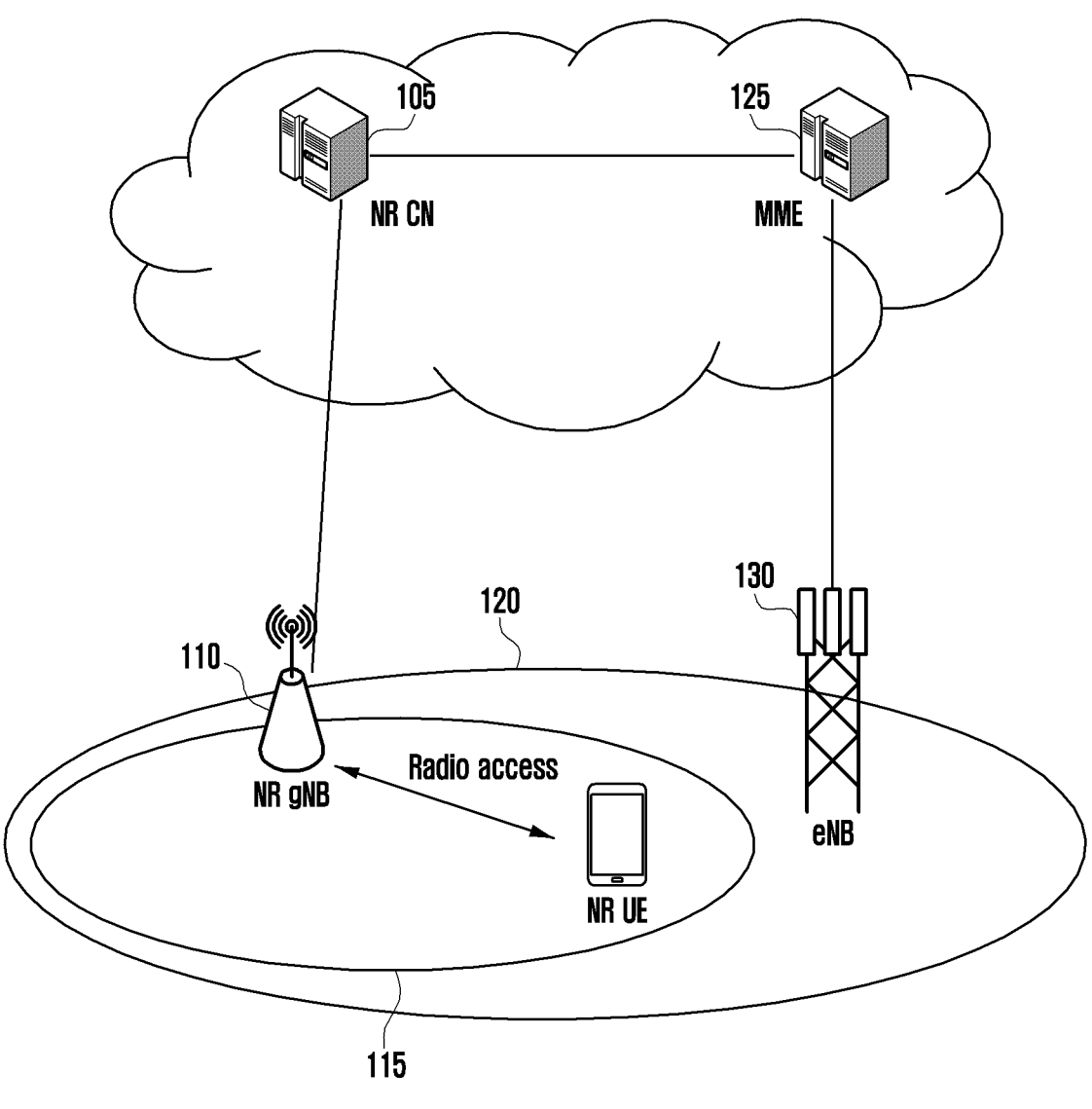
FIG. 1 is a diagram illustrating a structure of a next-generation mobile communication system to which the disclosure is applicable.

Hereinafter, embodiments of the disclosure will be described in detail with reference to the accompanying drawings.

In describing the embodiments, descriptions related to technical contents well-known in the art to which the disclosure pertains and not associated directly with the disclosure will be omitted. Such an omission of unnecessary descriptions is intended to prevent obscuring of the main ideas of the disclosure and more clearly transfer the main ideas.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the specifically depicted order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" may be implemented to reproduce one or more CPUs within a device or a security multimedia card. Furthermore, according to some embodiments, the "unit" may include one or more processors.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. By way of example, each of the phrases "at least one of A, B, and C" or "at least one of A, B, or C" refers to only A, only B, or only C; any combination of A, B, and C; and/or at least one of each of A, B, and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Hereinafter, the operation principle of the disclosure will be described in detail with reference to the accompanying drawings. In the following description of the disclosure, a detailed description of known functions or configurations incorporated herein will be omitted in case that it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. In the following description of the disclosure, a technology for receiving broadcast information from a base station by a terminal in a wireless communication system will be described. The disclosure relates to a communication technique for converging Internet of things (IoT) technology with 5th generation (5G) communication systems designed to support a higher data transfer rate beyond 4th generation (4G) systems, and a system therefor. The disclosure may be applied to intelligent services (e.g., smart homes, smart buildings, smart cities, smart cars or connected cars, health-care, digital education, retail business, security and safety-related services, etc.) on the basis of 5G communication technology and IoT-related technology.

In the following description, terms referring to broadcast information, terms referring to control information, terms related to communication coverage, terms referring to state changes (e.g., an event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, the terms "physical channel" and "signal" may be interchangeably used with the term "data" or "control signal". For example, the term "physical downlink shared channel (PDSCH)" or "physical uplink shared channel (PUSCH)" refers to a physical channel over which data is transmitted, but the PDSCH or PUSCH may be used to refer to "data". That is, in the disclosure, the expression "transmitting a physical channel" may be construed as the meaning equivalent to "transmitting data or a signal over a physical channel".

Furthermore, in the following description, the expression "performing a HARQ operation" may mean transmitting/receiving HARQ information corresponding to an acknowl-edgement (ACK) or negative acknowledgement (NACK) of transmission/reception of a PDSCH or PUSCH.

In the following description, some of terms and names defined in the 3rd generation partnership project long term evolution (3GPP LTE) or 3GPP new radio or new radio access technology (NR) standards may be used for the sake of descriptive convenience. However, the disclosure is not limited by these terms and names, and may be applied in the same way to systems that conform other standards.

FIG. 1 is a diagram illustrating a structure of a next-generation mobile communication system to which the disclosure is applicable.

Referring to FIG. 1, a radio-access network of a next-generation mobile communication system (hereinafter, new radio (NR) or 5G) 120 may include a next-generation base station (new radio node B, hereinafter, NR gNB or NR base station) 110 and a next-generation radio core network (new radio core network (NR CN)) 105. A next-generation radio user terminal (new radio user equipment (NR UE) or ter-minal) 115 may access an external network via the NR gNB 110 and the NR CN 105.

In FIG. 1, the NR gNB 110 may correspond to an evolved node B (eNB) of an existing LTE system. The NR gNB may be connected to the NR UE 115 via a radio channel and may provide a service superior to that of an existing Node B. In the next-generation mobile communication system, all user traffic may be serviced via a shared channel. Therefore, there is a need for a device which collects state information, such as buffer states, available transmission power states, and channel states of UEs, to perform scheduling, and the NR gNB 110 may be in charge of this. A single NR gNB may control multiple cells. In the next-generation mobile com-munication system, in order to implement ultra-fast data transmission compared to the current LTE, a bandwidth greater than or equal to a current maximum bandwidth may be applied. A beam-forming technology may be additionally incorporated using orthogonal frequency division multiplex-ing (OFDM) as a radio access technology. In addition, an adaptive modulation & coding (hereinafter, referred to as AMC) scheme that determines a modulation scheme and a channel coding rate according to a channel state of a terminal may be applied.

The NR CN 105 may perform functions, such as mobility support, bearer configuration, and quality of service (QoS) configuration. The NR CN is a device in charge of various control functions as well as a mobility management function for a terminal, and may be connected to multiple base stations. In addition, the next-generation mobile communi-cation system may be linked to an existing LTE system, and the NR CN may be connected to an MME 125 via a network interface. The MME may be connected to an eNB 130 that is an existing base station.

Figure 2:
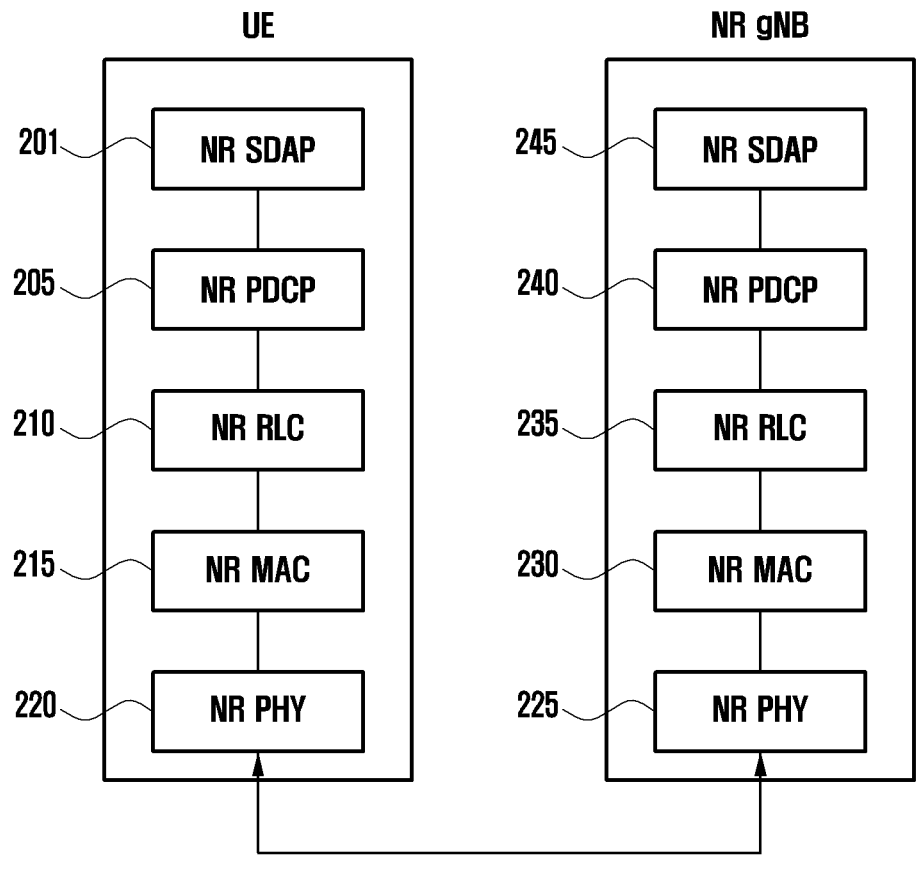
FIG. 2 is a diagram illustrating a radio protocol structure of the next-generation mobile communication system to which the disclosure is applicable.

FIG. 2 is a diagram illustrating a radio protocol structure of the next-generation mobile communication system to which the disclosure is applicable.

Referring to FIG. 2, a radio protocol of the next-genera-tion mobile communication system includes NR service data adaptation protocols (SDAPs) 201 and 245, NR packet data convergence protocols (PDCPs) 205 and 240, NR radio link controls (RLCs) 210 and 235, NR medium access controls (MACs) 215 and 230, and NR physicals (PHYs) 220 and 225 in a terminal and an NR base station, respectively.

Main functions of the NR SDAPs 201 and 245 may include some of the following functions:

User data transfer function (transfer of user plane data)

Function of mapping a QoS flow and a data bearer for an uplink and a downlink (mapping between a QoS flow and a DRB for both downlink (DL) and uplink (UL))

Function of marking a QoS flow ID in an uplink and a downlink (marking QoS flow

ID in both DL and UL packets) Function of mapping reflective QoS flows to data bearers for uplink SDAP protocol data units (PDUs) (reflective QoS flow to DRB mapping for the UL SDAP PDUs)

For an SDAP layer device, the terminal may be config-ured, via a radio resource control (RRC) message, whether to use a header of the SDAP layer device or use a function of the SDAP layer device per each PDCP layer device, per each bearer, or per each logical channel. In case that the SDAP header is configured, the terminal may perform indication using an access stratum (AS) QoS reflection configuration 1-bit indicator (AS reflective QoS) and a non-access stratum (NAS) quality of service (QoS) reflection configuration 1-bit indicator (NAS reflective QoS) of the SDAP header, so that the terminal may update or reconfigure mapping information on a QoS flow and a data bearer of uplink and downlink. The SDAP header may include QoS flow ID information indicating a QoS. The QoS information may be used as a data processing priority, scheduling information, etc. to support a smooth service.

Main functions of the NR PDCPs 205 and 240 may include some of the following functions:

Header compression and decompression function (robust header compression (ROHC) only)

User data transmission function (transfer of user data)

Sequential delivery function (in-sequence delivery of upper layer PDUs)

Non-sequential delivery function (out-of-sequence delivery of upper layer PDUs)

Reordering function (PDCP PDU reordering for reception)

Duplicate detection function (duplicate detection of lower layer service data units (SDUs))

Retransmission function (retransmission of PDCP SDUs)

Encryption and decryption function (ciphering and deciphering)

Timer-based SDU discard function (timer-based SDU discard in uplink)

In the above description, the reordering function of an NR PDCP device may refer to a function of reordering PDCP PDUs, which are received from a lower layer, in order based on a PDCP sequence number (SN). The reordering function of the NR PDCP device may include a function of transferring data to a higher layer in a reordered sequence, may include a function of directly transferring data without considering a sequence, may include a function of reordering and recording lost PDCP PDUs, may include a function of reporting states of the lost PDCP PDUs to a transmission side, and may include a function of requesting retransmission of the lost PDCP PDUS.

Main functions of the NR RLCs 210 and 235 may include some of the following function:

Data transmission function (transfer of upper layer PDUs)

Sequential delivery function (in-sequence delivery of upper layer PDUs)

Non-sequential delivery function (out-of-sequence delivery of upper layer PDUs)

automatic repeat request (ARQ) function (error correction through ARQ)

Concatenation, segmentation, and reassembly function (concatenation, segmentation and reassembly of RLC SDUs)

Re-segmentation function (re-segmentation of RLC data PDUs)

Reordering function (reordering of RLC data PDUs)

Duplicate detection function

Error detection function (protocol error detection)

RLC SDU discard function

RLC re-establishment function

In the above description, the in-sequence delivery function of an NR RLC device may refer to a function of sequentially transferring, to a higher layer, RLC SDUs received from a lower layer. In case that an originally one RLC SDU is divided into multiple RLC SDUs and then received, the in-sequence delivery function of the NR RLC device may include a function of reassembling and then transferring the RLC SDUs.

The in-sequence delivery function of the NR RLC device may include a function of rearranging the received RLC PDUs according to an RLC sequence number (SN) or a PDCP sequence number (SN), may include a function of reordering and recording lost RLC PDUs, may include a function of reporting states of the lost RLC PDUs to a transmission side, and may include a function of requesting retransmission of lost RLC PDUs.

The in-sequence delivery function of the NR RLC 210 or 235 device may include a function of, in case that a lost RLC SDU exists, sequentially transferring, to the higher layer, only RLC SDUs before the lost RLC SDU. The in-sequence delivery function of the NR RLC device may include a function of, even if there is a lost RLC SDU, if a predetermined timer expires, sequentially transferring all RLC SDUs, which are received before the timer starts, to the higher layer. In addition, the in-sequence delivery function of the NR RLC device may include a function of, even if there is a lost RLC SDU, if a predetermined timer expires, sequentially transferring all currently received RLC SDUs to the higher layer.

The NR RLC 210 or 235 device may process RLC PDUs in the order of receiving the same regardless of the order of sequence numbers (out of sequence delivery) and may transfer the processed RLC PDUs to the NR PDCP 205 or 240 device.

In case that the NR RLC 210 or 235 device receives a segment, segments that are stored in a buffer or to be received at a later time are received, reconstructed into one complete RLC PDU, and then transferred to the NR PDCP device.

An NR RLC layer may not include a concatenation function, and the function may be performed in an NR media access control (MAC) layer or may be replaced with a multiplexing function of the NR MAC layer.

In the above description, the out-of-sequence delivery function of the NR RLC device may refer to a function of directly transferring RLC SDUs, which are received from a lower layer, to a higher layer regardless of order. The out-of-sequence delivery function of the NR RLC device may include a function of, in case that an originally one RLC SDU is divided into multiple SDUs and then received, reassembling the RLC SDUs and then transferring the same. The out-of-sequence delivery function of the NR RLC device may include a function of storing the RLC SNs or PDCP SNs of the received RLC PDUs, arranging the order, and recording lost RLC PDUs.

The NR MACs 215 and 230 may be connected to multiple NR RLC layer devices included in one terminal, and main functions of the NR MACs may include some of the following functions:

Mapping function (mapping between logical channels and transport channels)

Multiplexing and demultiplexing function (multiplexing/demultiplexing of MAC SDUs)

Scheduling information reporting function

Hybrid automatic repeat request (HARQ) function (error correction through HARQ)

Function of priority handling between logical channels (priority handling between logical channels of one UE)

Function of priority handling between terminals (priority handling between UEs by means of dynamic scheduling)

MBMS service identification function

Transport format selection function

Padding function

The NR physical (PHY) layers 220 and 225 may perform channel coding and modulation of higher-layer data, make the channel coded and modulated higher-layer data into OFDM symbols, and transmit the OFDM symbols via a radio channel, or may perform demodulation and channel-decoding of the OFDM symbols received via the radio channel so as to transfer the same to a higher layer.

Hereinafter, a frame structure of the communication system to which the disclosure is applicable will be described in more detail with reference to the drawings.

Figure 3:
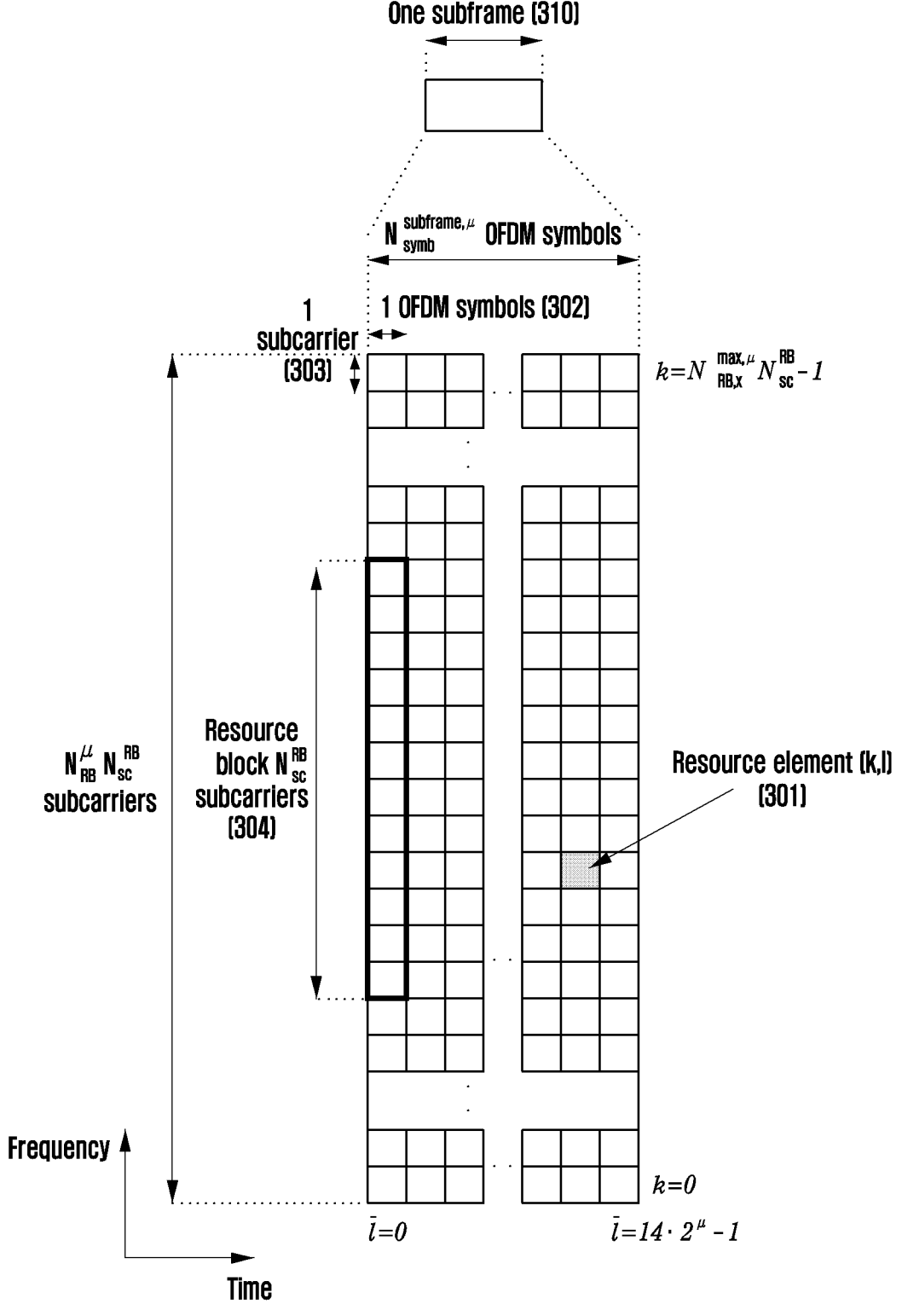
FIG. 3 is a diagram illustrating a basic structure of a time-frequency domain which is a radio resource area in which a data or control channel is transmitted in a communication system according to an embodiment of the disclosure.

FIG. 3 is a diagram illustrating a basic structure of a time-frequency domain which is a radio resource area in which a data or control channel is transmitted in a communication system according to an embodiment of the disclosure.

In FIG. 3, a horizontal axis represents a time domain, and a vertical axis represents a frequency domain. A basic unit of resources in the time and frequency domains is a resource element (RE) 301 and may be defined to be 1 orthogonal frequency division multiplexing (OFDM) symbol 302 on the time axis and 1 subcarrier 303 on the frequency axis. In the frequency domain, $$N_{SC}^{RB}$$

(e.g., 12) consecutive REs may constitute one resource block (RB) 304. In the time domain, $$N_{symb}^{subframe,\mu}$$

consecutive OFDM symbols may constitute one subframe 310.

Figure 4:
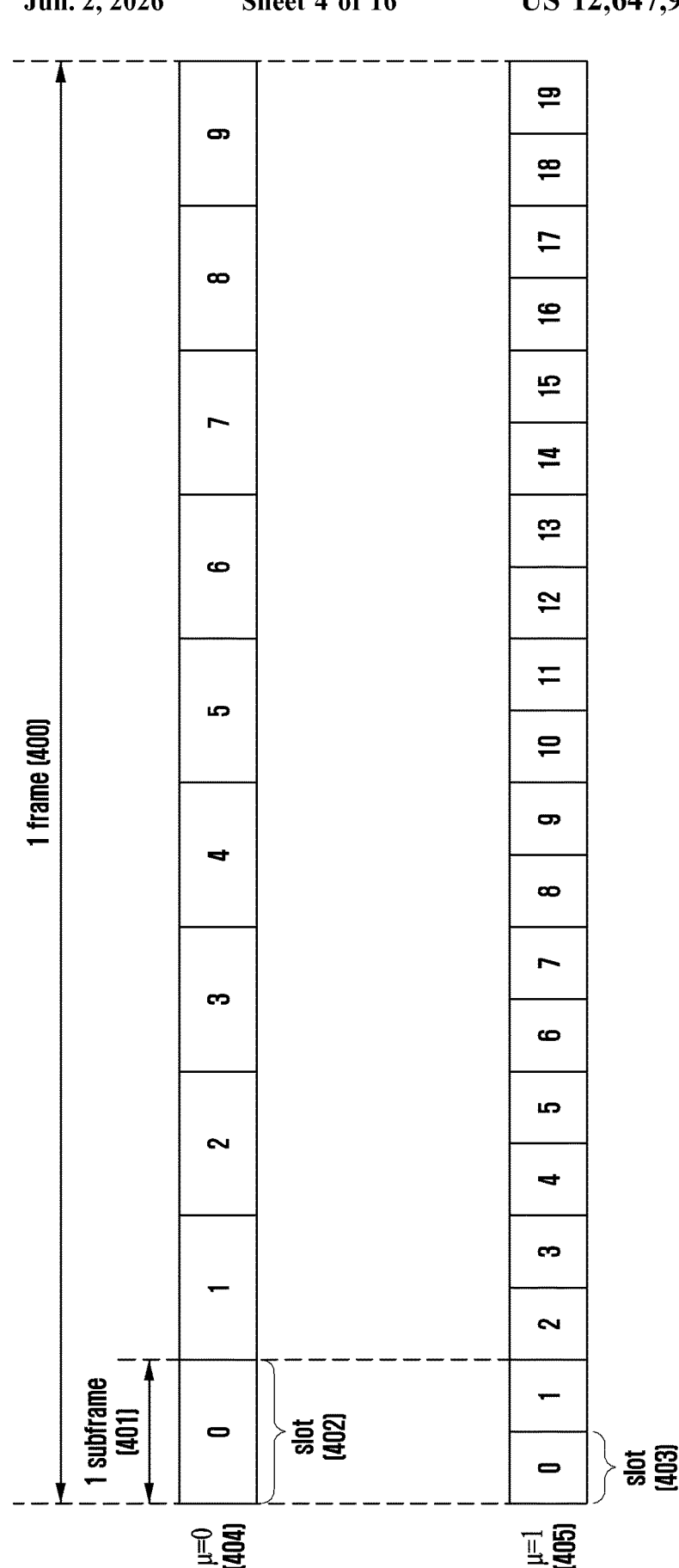
FIG. 4 is a diagram illustrating an example of a slot structure considered in the communication system according to an embodiment of the disclosure.

FIG. 4 is a diagram illustrating an example of a slot structure considered in the communication system according to an embodiment of the disclosure.

FIG. 4 illustrates an example of a frame 400, a subframe 401, and a slot 402 structure. One frame 400 may be defined to be 10 ms. One subframe 401 may be defined to be 1 ms, and therefore one frame 400 may include a total of 10 subframes 401. One slot 402 or 403 may be defined to be 14 OFDM symbols (that is, the number $$\left(N_{symb}^{slot}\right)$$

of symbols per slot=14). One subframe 401 may include one or multiple slots 402 and 403, and the number of slots 402 and 403 per subframe 401 may vary according to configuration values u 404 and 405 for subcarrier spacings. In an example of FIG. 4, a case where subcarrier spacing configuration value µ=0 404, and a case where subcarrier spacing configuration value µ=1 405 are illustrated. If µ=0 404, one subframe 401 may include one slot 402, and if µ=1 405, one subframe 401 may include two slots 403. That is, the number $$\left(N_{slot}^{subframe,\mu}\right)$$

of slots per subframe may vary according to subcarrier spacing configuration value µ, and accordingly, the number $$\left(N_{slot}^{frame,\mu}\right)$$

of slots per frame may vary.

$$N_{slot}^{subframe,\mu} \text{ and } N_{slot}^{frame,\mu}$$

according to respective subcarrier spacing configurations u may be defined as in Table 1 below.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Subsequently, a bandwidth part (BWP) configuration in the communication system to which the disclosure is applicable will be described in detail with reference to FIG. 5.

Figure 5:
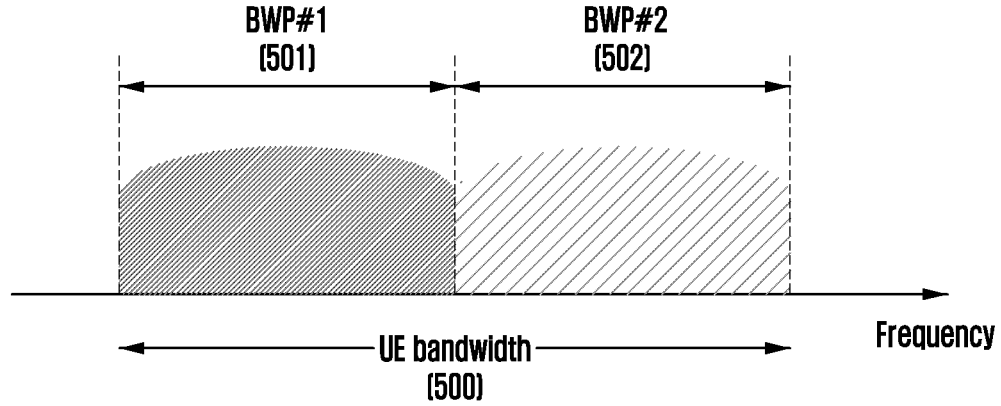
FIG. 5 is a diagram illustrating an example of a configuration for a bandwidth part in the communication system according to an embodiment of the disclosure.

FIG. 5 is a diagram illustrating an example of a configuration for a bandwidth part in the communication system according to an embodiment of the disclosure.

FIG. 5 illustrates an example in which a terminal bandwidth (UE bandwidth) 500 is configured to have two bandwidth parts, i.e., bandwidth part #1 501 and bandwidth part #2 502. A base station may configure one or multiple bandwidth parts for a terminal, and may configure, for example, information as in Table 2 below, with respect to each bandwidth part. The following BWP may be referred to as BWP configuration information.

TABLE 2

```
BWP ::=                                    SEQUENCE {
    bwp-Id
    BWP-Id,
  (Bandwidth part identifier)
    locationAndBandwidth
    INTEGER(1..65536),
    (Bandwidth part location)
    subcarrierSpacing
    ENUMERATED {n0, n1, n2, n3, n4, n5},
    (Subcarrier spacing)
    cyclicPrefix
    ENUMERATED { extended }
    (Cyclic prefix)
}
```

The disclosure is not limited to the above example, and in addition to the configuration information, various parameters related to a bandwidth part may be configured for the terminal. The base station may transfer the information to the terminal via higher-layer signaling, for example, radio resource control (RRC) signaling. At least one bandwidth part among the configured one or multiple bandwidth parts may be activated. Whether the configured bandwidth part is active may be delivered from the base station to the terminal in a semi-static manner via RRC signaling or may be dynamically delivered via downlink control information (DCI).

According to some embodiments, the base station may configure, via a master information block (MIB), an initial bandwidth part (BWP) for initial access for the terminal before an RRC connection. More specifically, during the initial access, the terminal may receive configuration information for a search space and a control resource set (CORESET) in which a physical downlink control channel (PDCCH) for receiving system information (may correspond to remaining system information (RMSI) or system information block 1 (SIB1)) required for the initial access may be transmitted via the MIB. Each of the search space and the control resource set configured via the MIB may be considered to be identifier (identity (ID)) 0. The base station may notify, via the MIB, the terminal of configuration information, such as frequency assignment information, time assignment information, and numerology for control resource set #0. In addition, the base station may notify, via the MIB, the terminal of configuration information for a monitoring period and occurrence for control resource set #0, that is, the configuration information for search space #0. The terminal may consider a frequency domain configured to be control resource set #0, which is acquired from the MIB, as an initial bandwidth part for initial access. In this case, an identity (ID) of the initial bandwidth part may be considered to be 0.

The configuration of a bandwidth part supported by the communication system may be used for various purposes.

According to some embodiments, if a bandwidth supported by the terminal is smaller than a system bandwidth, this may be supported via the bandwidth part configuration. For example, the base station may configure, for the terminal, a frequency position (configuration information 2) of the bandwidth part, and the terminal may thus transmit or receive data at a specific frequency position within the system bandwidth.

According to some embodiments, for the purpose of supporting different numerologies, the base station may configure multiple bandwidth parts for the terminal. For example, in order to support data transmission or reception using both a subcarrier spacing of 15 kHz and a subcarrier spacing of 30 kHz for a certain terminal, the base station may configure two bandwidth parts with the subcarrier spacings of 15 kHz and 30 kHz, respectively. Different bandwidth parts may be frequency-division-multiplexed, and in case that data is to be transmitted or received at a specific subcarrier spacing, a bandwidth part configured with the subcarrier spacing may be activated.

According to some embodiments, for the purpose of reducing power consumption of the terminal, the base station may configure, for the terminal, bandwidth parts having different bandwidth sizes. For example, if the terminal supports a very large bandwidth, for example, a bandwidth of 100 MHz, and always transmits or receives data via the corresponding bandwidth, very large power consumption may occur. In particular, in a situation where there is no traffic, it may be very inefficient, in terms of power consumption, to perform unnecessary monitoring for a downlink control channel with a large bandwidth of 100 MHz. For the purpose of reducing power consumption of the terminal, the base station may configure, for the terminal, a bandwidth part of a relatively small bandwidth, for example, a bandwidth part of 20 MHz. In the situation where there is no traffic, the terminal may perform monitoring in the bandwidth part of 20 MHz, and in case that data is generated, the terminal may transmit or receive the data by using the bandwidth part of 100 MHz according to an indication of the base station.

In the method for configuring a bandwidth part, terminals before an RRC connection may receive configuration information for an initial bandwidth part via an MIB during initial access. More specifically, the terminal may be configured with a control resource set (CORESET) for a downlink control channel on which DCI for scheduling of an SIB may be transmitted from an MIB of a physical broadcast channel (PBCH). A bandwidth of the control resource set configured via the MIB may be considered to be an initial bandwidth part, and the terminal may receive, via the configured initial bandwidth part, a PDSCH on which an SIB is transmitted. In addition to reception of the SIB, the initial bandwidth part may be used for other system information (OSI), paging, and random access.

Figure 6:
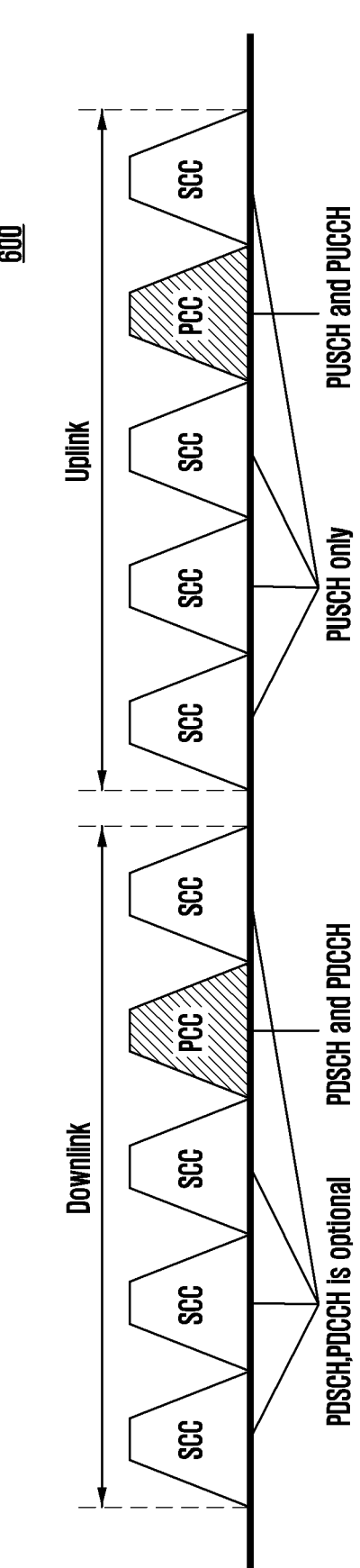
FIG. 6 is a diagram illustrating carrier aggregation (CA) according to an embodiment of the disclosure.

FIG. 6 is a diagram illustrating carrier aggregation (CA) according to an embodiment of the disclosure.

Referring to FIG. 6, in case that CA is configured 600, a primary cell (PCell) and a secondary cell (SCell) may be configured for a terminal.

The PCell may be included in a primary component carrier (PCC), and may provide RRC connection establishment/re-establishment, measurement, a mobility procedure, a random-access procedure and selection, system information acquisition, initial random-access, a security key change, a non-access stratum (NAS) function, and the like.

Since the terminal performs system information monitoring via the PCell, the PCell is not deactivated, and in a UL, the PCC is carried via a physical uplink control channel (PUCCH) for control information transmission. In addition, only one RRC connection is possible between the terminal and the PCell, and PDCCH/PDSCH/physical uplink shared channel (PUSCH)/PUCCH transmission is possible. In addition, in a secondary cell group, an SPcell of the secondary cell group (PSCell) may be configured as the PCell so that an operation is performed. Operations for a PCell described below may also be performed in a PSCell.

In some embodiments, up to a total of 31 SCells may be added, and in the case that an additional radio resource needs to be provided, an SCell may be configured via an RRC message (e.g., dedicated signaling). The RRC message may include a physical cell ID per each cell, and a DL carrier frequency (absolute radio frequency channel number (ARFCN)) may be included. PDCCH/PDSCH/PUSCH transmission is possible via an SCell. Via a MAC layer, for UE battery conservation, dynamic activation and deactivation procedures of the SCell are supported.

Cross-carrier scheduling may refer to allocating, to one component carrier (CC), at least one (e.g., PDCCH) of all L1 control channels or L2 control channels for at least one other CC. A carrier indicator field (CIF) may be used to transmit data information of another CC via a PDCCH of one CC.

Based on control information transmitted via the PDCCH of one CC, resources (PDSCH and PUSCH) for data transmission of the CC or resources (PDSCH and PUSCH) for data transmission of another CC may be allocated.

With application of cross-carrier scheduling, an n-bit CIF is added to a DCI format, a bit size may vary depending on a higher-layer configuration or the DCI format, and a CIF position in the DCI format may be fixed.

FIG. 7 is a diagram illustrating an example of a cross-carrier scheduling method according to an embodiment of the disclosure.

Referring to reference numeral 710 of FIG. 7, PDSCHs or PUSCHs for two CCs may be scheduled via a PDCCH 701 of one CC.

In addition, referring to reference numeral 720 of FIG. 7, if a total of four CCs is configured, the PDSCHs or PUSCHs of the respective CCs may be scheduled using PDCCHs 721 and 723 of the two CCs.

The respective CCs may be mapped to carrier indicator (CI) values for CIF application, and this may be transmitted as a UE-specific configuration to a terminal by a base station via a dedicated RRC signal.

Each PDSCH/PUSCH CC may be scheduled from one DL CC. Therefore, the UE needs to monitor the PDCCH only in the DL CC per each PDSCH/PUSCH CC. The terminal may acquire PUSCH scheduling information in a linked UL carrier by monitoring the PDCCH in the DL CC. The terminal may acquire PDSCH scheduling information in a linked DL carrier by monitoring the PDCCH in the DL CC.

Figure 8:
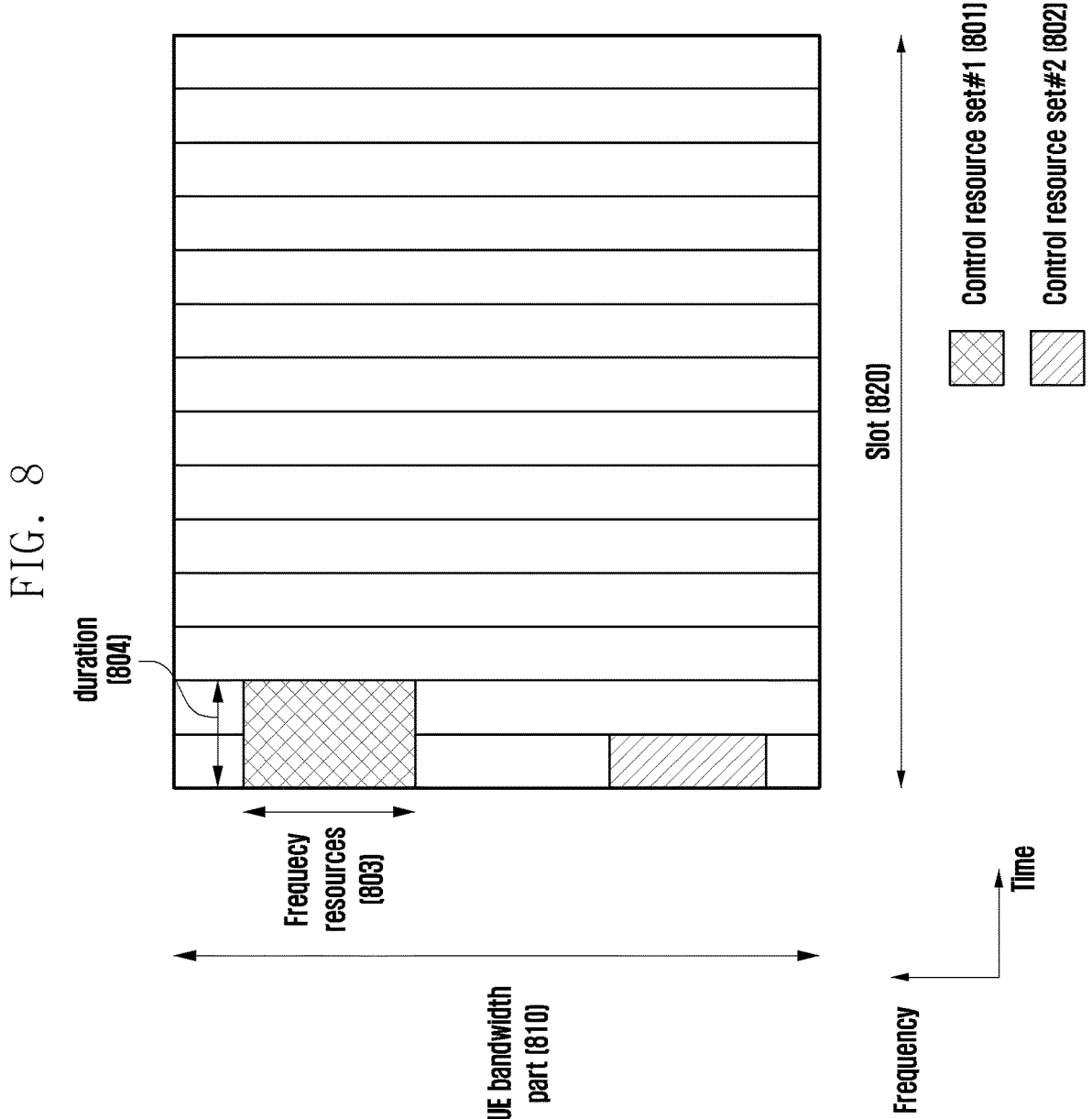
FIG. 8 is a diagram illustrating an example of a control area (control resource set (CORESET)) configuration of a downlink control channel in the communication system according to an embodiment of the disclosure.

FIG. 8 is a diagram illustrating an example of a control area (control resource set (CORESET)) configuration of a downlink control channel in the communication system according to an embodiment of the disclosure.

Referring to FIG. 8, FIG. 8 illustrates an example in which a bandwidth part 810 of a terminal is configured on the frequency axis, and two control areas (control resource set #1 (CORESET #1) 801 and control resource set #2 (CORESET #2) 802) are configured within one slot 820 on the time axis. The control resource sets 801 and 802 may be configured in a specific frequency resource 803 within the entire terminal bandwidth part 810 on the frequency axis. The control resource sets 801 and 02 may be configured by one or multiple OFDM symbols on the time axis, which may be defined as a control resource set duration 804. In an example of FIG. 8, control resource set #1 801 is configured to have a control resource set duration of 2 symbols, and control resource set #2 802 is configured to have a control resource set duration of 1 symbol.

The control resource sets in the communication system described above may be configured for a terminal by a base station via higher-layer signaling (e.g., system information, MIB, and RRC signaling). Configuring a control resource set for a terminal may refer to providing the terminal with information, such as a control resource set identifier (identity), a frequency position of the control resource set, and a symbol length of the control resource set. For example, information in Table 3 below may be included.

TABLE 3

| ControlResourceSet ::= | SEQUENCE { |
| controlResourceSetId | ControlResourceSetId, |
| frequencyDomainResources | BIT STRING (SIZE (45)), |
| duration | INTEGER |
| (1..maxCoReSetDuration), | |
| cce-REG-MappingType | CHOICE { |
| interleaved | SEQUENCE { |
| reg-BundleSize | ENUMERATED {n2, n3, n6}, |
| interleaverSize | ENUMERATED {n2, n3, n6}, |
| shiftIndex | |
| INTEGER(0..maxNrofPhysicalResourceBlocks-1) | OPTIONAL -- Need S |
| }, | |
| nonInterleaved | NULL |
| }, | |
| tci-StatesPDCCH-ToReleaseList | SEQUENCE(SIZE |
| (1..maxNrofTCI-StatesPDCCH)) OF TCI-StateId OPTIONAL, -- Cond NotSIB-initialBWP | |
| tci-PresentInDCI | ENUMERATED |
| {enabled} | OPTIONAL, -- Need S |

The number of control channel elements (CCEs) required to transmit a PDCCH may be, for example, 1, 2, 4, 8, or 16 depending on an aggregation level (AL), and different numbers of CCEs may be used to implement link adaptation of the downlink control channel. For example, if AL=L, a single downlink control channel may be transmitted via L CCEs. The terminal needs to detect a signal without knowing information on the downlink control channel (blind decoding), and a search space representing a set of CCEs is defined for blind decoding. A search space is a set of downlink control channel candidates including CCEs, for which the terminal needs to attempt decoding on a given aggregation level, and since there are various aggregation levels that make one bundle with 1, 2, 4, 8, or 16 CCEs, the terminal may have multiple search spaces. A search space set may be defined to be a set of search spaces at all configured aggregation levels.

A search space may be classified into a common search space and a terminal-specific (UE-specific) search space. A certain group of terminals or all terminals may examine a common search space of a PDCCH in order to receive cell-common control information, such as dynamic scheduling for system information or a paging message. For example, PDSCH scheduling assignment information for transmission of an SIB including cell operator information, etc. may be received by monitoring the common search space of the PDCCH. Since a certain group of terminals or all terminals need to receive the PDCCH, the common search space may be defined as a set of predetermined CCEs. Scheduling assignment information for a UE-specific PDSCH or PUSCH may be received by monitoring a UE-specific search space of the PDCCH. The UE-specific search space may be defined UE-specifically, based on an identity of the terminal and functions of various system parameters.

In the communication system to which the disclosure is applicable, a parameter for a search space of a PDCCH may be configured for a terminal by a base station via higher-layer signaling (e.g., an SIB, an MIB, and RRC signaling). For example, the base station may configure, for the terminal, the number of PDCCH candidates at each aggregation level L, a monitoring period for a search space, a monitoring occurrence per symbol in a slot for the search space, a search space type (common search space or UE-specific search space), a combination of a radio network temporary identifier (RNTI) and a DCI format, which is to be monitored in the search space, a control resource set index for monitoring of the search space, etc. For example, the parameter for the search space of the PDCCH may include at least some of the information shown in Table 4 below.

TABLE 4

| SearchSpace ::= | SEQUENCE { |
| --Identify of the search space. SearchSpaceID = 0 identifies the | |
| SearchSpace configured via PBCH(MIB) or ServingCellConfigCommon. | |
| searchSpaceId | SearchSpaceId, |
| controlResourceSetId | ControlResourceSetId |
| monitoringSlotPeriodicityAndOffset | CHOICE { |
| sl1 | NULL, |
| sl2 | INTEGER (0.. 1), |
| sl4 | INTEGER (0..3), |
| sl5 | INTEGER (0..4), |
| sl8 | INTEGER (0..7), |
| sl10 | INTEGER (0..9), |
| sl16 | INTEGER (0..15), |
| sl20 | INTEGER (0..19), |
| } | |
| OPTIONAL, | |
| duration | INTEGER (2..2559) |
| OPTIONAL, | |
| monitoringSymbolsWithinSlot | BIT STRING (SIZE (14)) |

TABLE 4-continued

```
OPTIONAL,
    nrofCandidates                      SEQUENCE {
        aggregationLevel1               ENUMERATED {n0,
n1, n2, n3, n4, n5, n6, n8},
        aggregationLevel2               ENUMERATED {n0,
n1, n2, n3, n4, n5, n6, n8},
        aggregationLevel4               ENUMERATED {n0,
n1, n2, n3, n4, n5, n6, n8},
        aggregationLevel8               ENUMERATED {n0,
n1, n2, n3, n4, n5, n6, n8},
        aggregationLevel16              ENUMERATED {n0,
n1, n2, n3, n4, n5, n6, n8}
    }
    searchSpaceType                     CHOICE {
Configures this search space as common search space(CSS) and DCI
formats to monitor.
        common                          SEQUENCE {
        },
        ue-Specific                     SEQUENCE {
--indicates wheter the UE monitors in this USS for DCI formats 0-0 and
1-0 or for formats 0-1 and 1-1
            dci-Formats
ENUMERATED {formats0-0-And-1-0, formats0-1-And-1-1},
            . . .
    }
```

The base station may configure one or multiple search space sets for the terminal. According to some embodiments, the base station may configure search space set 1 and search space set 2 for the terminal. The terminal may be configured to monitor DCI format A scrambled with an X-RNTI in the common search space in search space set 1, and may be configured to monitor DCI format B scrambled with a Y-RNTI in the UE-specific search space in search space set 2.

According to the configuration information, one or multiple search space sets may exist in the common search space or the UE-specific search space. For example, search space set #1 and search space set #2 may be configured to be a common search space, and search space set #3 and search space set #4 may be configured to be a UE-specific search space.

In the common search space, the following combinations of DCI formats and RNTIs may be monitored. Of course, the disclosure is not limited to the following examples:
DCI format 0_0/1_0 with CRC (cyclic redundancy check) scrambled by C-RNTI, CS-RNTI, SP-CSI-RNTI, RA-RNTI, TC-RNTI, P-RNTI, SI-RNTI
DCI format 2_0 with CRC scrambled by SFI-RNTI
DCI format 2_1 with CRC scrambled by INT-RNTI
DCI format 2_2 with CRC scrambled by TPC-PUSCH-RNTI, TPC-PUCCH-RNTI
DCI format 2_3 with CRC scrambled by TPC-SRS-RNTI
In the UE-specific search space, the following combinations of DCI formats and RNTIs may be monitored. Of course, the disclosure is not limited to the following examples:
DCI format 0_0/1_0 with CRC scrambled by C-RNTI, CS-RNTI, TC-RNTI
DCI format 1_0/1_1 with CRC scrambled by C-RNTI, CS-RNTI, TC-RNTI
The specified RNTIs may follow definitions and uses below.
C-RNTI (Cell RNTI): For UE-specific PDSCH scheduling
Temporary cell RNTI (TC-RNTI): For UE-specific PDSCH scheduling
Configured scheduling RNTI (CS-RNTI): For semi-statically configured UE-specific PDSCH scheduling Random-access RNTI (RA-RNTI): For PDSCH scheduling during random-access
Paging RNTI (P-RNTI): For scheduling PDSCH on which paging is transmitted
System information RNTI (SI-RNTI): For scheduling PDSCH on which system information is transmitted
Interruption RNTI (INT-RNTI): For indicating whether to puncture PDSCH
Transmit power control for PUSCH RNTI (TPC-PUSCH-RNTI): For indicating power control command for PUSCH
Transmit power control for PUCCH RNTI (TPC-PUCCH-RNTI): For indicating power control command for PUCCH
Transmit power control for SRS RNTI (TPC-SRS-RNTI): For indicating power control command for SRS.

In 5G, a search space of aggregation level L in search space set s, and control resource set p may be expressed as Equation 1 below.

$$L \cdot \left\{ Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i \qquad \text{Equation 1}$$

L: aggregation level
$n_{CI}$: carrier index
$N_{CCE,p}$: a total number of CCEs existing in control resource set p $$n_{s,f}^{\mu}:$$

slot index $$M_{s,max}^{(L)}:$$

the number of PDCCH candidates for aggregation level L
$m_{s,n_{CI}} = 0, \ldots ,$ $$M_{s,max}^{(L)} - 1:$$

candidate index of aggregation level L
$i = 0 \ldots L-1$ $$Y_{p,n_{s,f}^{\mu}} = \left( A_p \cdot Y_{p,n_{s,f}^{\mu}-1} \right) \bmod D,$$

$Y_{p,-1} = n_{RNTI} \neq 0$, $A_p = 39827$ for p mod 3=0, $A_p = 39829$ for p mod 3=1, $A_p = 39839$ for p mod 3=2, and D=65537
$n_{RNTI}$: terminal identifier
A value of $$Y_{p,n_{s,f}^{\mu}}$$

may correspond to 0 in the common search space.
In the UE-specific search space, the value of $$Y_{p,n_{s,f}^\mu}$$

may correspond to a value that varies depending on a time index and the identity (a C-RNTI or an ID configured for the terminal by the base station) of the terminal.

Accordingly, the terminal may monitor the PDCCH in the control resource set configured by the base station, and may transmit or receive data, based on the received control information.

In the communication system to which the disclosure is applicable, scheduling information for uplink data (or physical uplink data channel (physical uplink shared channel (PUSCH))) or downlink data (or physical downlink data channel (physical downlink shared channel (PDSCH))) is transferred from the base station to the terminal via DCI. The terminal may monitor a fallback DCI format and a non-fallback DCI format for the PUSCH or PDSCH. The fallback DCI format may include a fixed field predefined between the base station and the terminal, and the non-fallback DCI format may include a configurable field.

DCI may be transmitted on a physical downlink control channel (PDCCH) via channel coding and modulation. A CRC is added to a DCI message payload, and the CRC may be scrambled based on an RNTI corresponding to the identity of the terminal. Different RNTIs may be used according to the purpose of the DCI message, for example, terminal-specific (UE-specific) data transmission, a power control command, a random-access response, or the like. In other words, the RNTI is not transmitted explicitly, but is included in CRC calculation and transmitted. In case that the DCI message transmitted on the PDCCH is received, the terminal may check the CRC by using an assigned RNTI and may determine, if a CRC check result is correct, that the message is transmitted to the terminal.

For example, DCI for scheduling of a PDSCH for system information (SI) may be scrambled by an SI-RNTI. DCI for scheduling of a PDSCH for a random-access response (RAR) message may be scrambled by an RA-RNTI. DCI for scheduling of a PDSCH for a paging message may be scrambled by a P-RNTI. DCI for notification of a slot format indicator (SFI) may be scrambled by an SFI-RNTI. DCI for notification of a transmit power control (TPC) may be scrambled by a TPC-RNTI. DCI for scheduling of a UE-specific PDSCH or PUSCH may be scrambled by a cell RNTI (C-RNTI).

In the communication system to which the disclosure is applicable, various types of DCI formats may be provided as in Table 5 below, for efficient reception of control information by the terminal.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 1_0, DCI format 1_1, or DCI format 1_2 to assign (schedule) a PDSCH for one cell to the terminal. For another example, the base station may use DCI format 0_0, DCI format 0_1, or DCI format 0_2 to assign (schedule) a PUSCH for one cell to the terminal.

DCI format 1_0 may include at least the following information in case that transmitted with a CRC scrambled by a C-RNTI, a CS-RNTI, an MCS-C-RNTI, or a new-RNTI:

TABLE 6

Identifier for DCI formats (1 bit): DCI format indicator which is always configured to be 1

Frequency domain resource assignment ($N_{RBG}$ bits or $\left\lceil \log_2\left(N_{RB}^{DL,BWP}\left(N_{RB}^{DL,BWP}+1\right)/2\right)\right\rceil$ bits):

Indicating frequency axis resource allocation, wherein, when DCI format 1_0 is monitored in a UE-specific search space, $N_{RB}^{DL,BWP}$ indicates a size of an active DL BWP, and in other cases, $N_{RB}^{DL,BWP}$ indicates a size of an initial DL BWP.

$N_{RBG}$ is the number of resource block groups. For a detailed method, the frequency axis resource allocation is referred to.

Time domain resource assignment (0 to 4 bits): Indicating time axis resource allocation of a PDSCH.

VRB-to-PRB mapping (1 bit): 0 indicates non-interleaved VRB-to-PRB mapping, and 1 indicates interleaved VRP-to-PRB mapping.

Modulation and coding scheme (5 bits): Indicating a modulation order and a coding rate used for PDSCH transmission.

New data indicator (1 bit): Indicating whether a PDSCH corresponds to initial transmission or retransmission, according to toggling.

Redundancy version (2 bits): Indicating a redundancy version used for PDSCH transmission.

HARQ process number (4 bits): Indicating an HARQ process number used for PDSCH transmission.

Downlink assignment index (2 bits): DAI indicator

TPC command for scheduled PUCCH (2 bits): PUCCH power control indicator

PUCCH resource indicator (3 bits): PUCCH resource indicator which indicates one of eight resources configured via a higher layer.

PDSCH-to-HARQ_feedback timing indicator (3 bits): HARQ feedback

TABLE 6-continued timing indicator which indicates one of eight feedback timing offsets
configure via a higher layer.

---

DCI format 1_1 may include at least the information as in Table 7 in case that transmitted with a CRC scrambled by a cell radio network temporary identifier (C-RNTI), a configured scheduling RNTI (CS-RNTI), an MCS-C-RNTI, or a new-RNTI.

TABLE 7

Identifier for DCI formats (1 bit): DCI format indicator which is always configured to be 1
Carrier indicator (0 or 3 bits): Indicating a CC (or cell) in which a PDSCH allocated by corresponding DCI is transmitted.
Bandwidth part indicator (0, 1, or 2 bits): Indicating a BWP in which a PDSCH allocated by corresponding DCI is transmitted.
Frequency domain resource assignment (a payload is determined accordingt o the frequency axis resource allocation):
Indicating frequency axis resource allocation, wherein $N_{RB}^{DL,BWP}$ indicates a size of an initial DL BWP.

For a detailed method, the frequency axis
resource allocation is referred to.
Time domain resource assignment (0 to 4 bits): Indicating time axis resource allocation according to the above description.
VRB-to-PRB mapping (0 or 1 bit): 0 indicates non-interleaved VRB-to-PRB mapping, and 1 indicates interleaved
VRP-to-PRB mapping. 0 bit indicates a case where frequency axis resource allocation is configured to be resource allocation type 0 or a case where interleaved VRB-to-PRB mapping is not configured by a higher layer.
PRB bundling size indicator
(0 or 1 bit): 0 bit if a higher layer parameter of prb-BundlingType is not configured or is configured to be "static", and 1 bit if the same is configured to be "dynamic".
Rate matching indicator (0, 1, or 2 bits): Indicating a rate matching pattern.
ZP CSI-RS trigger (0, 1, or 2 bits): Indicator that triggers an aperiodic ZP CSI-RS.
For transport block 1:
Modulation and coding scheme (5 bits): Indicating a modulation order and a coding rate used for PDSCH transmission.
New data indicator (1 bit): Indicating whether a PDSCH corresponds to initial transmission or retransmission, according to toggling.
Redundancy version (2 bits): Indicating a redundancy version used for PDSCH transmission.
For transport block 2:
Modulation and coding scheme (5 bits): Indicating a modulation order and a coding rate used for PDSCH transmission.
New data indicator (1 bit): Indicating whether a PDSCH corresponds to initial transmission or retransmission, according to toggling.
Redundancy version (2 bits): Indicating a redundancy version used for PDSCH transmission.
HARQ process number (4 bits): Indicating an HARQ process number used for PDSCH transmission.
Downlink assignment index (0, 2, or 4 bits): DAI indicator
TPC command for scheduled PUCCH (2 bits): PUCCH power control indicator
PUCCH resource indicator (3 bits): PUCCH resource indicator which indicates one of eight resources configured via a higher layer.
PDSCH-to-HARQ_feedback timing indicator (3 bits): HARQ feedback timing indicator which indicates one of eight feedback timing offsets configure via a higher layer.
Antenna port (4, 5, or 6 bits): Indicating a DMRS port and a CDM group without data.
Transmission configuration indication (0 or 3 bits): TCI indicator
SRS request (2 or 3 bits): SRS transmission request indicator
CBG transmission information (0, 2, 4, 6, or 8 bits): Indicator indicating whether to transmit code block groups within an allocated PDSCH. 0 indicates that a corresponding CBG is not transmitted, and 1 indicates that the CBG is transmitted.
CBG flushing out information (0 or 1 bit): Indicator indicating whether previous CBGs are contaminated. 0 indicates that previous CBGs might be contaminated, and 1 indicates that previous CBGs are available (combinable) when retransmission is received.

TABLE 7-continued

DMRS sequence initialization (0 or 1 bit): DMRS scrambling ID selection indicator

---

DCI format 1_2 may include at least the information as in Table 8 in case that transmitted with a CRC scrambled by a cell radio network temporary identifier (C-RNTI), a configured scheduling RNTI (CS-RNTI), an MCS-C-RNTI, or a new-RNTI.

TABLE 8

Identifier for DCI formats (1 bit): DCI format indicator which is always configured to be 1
Carrier indicator (0, 1, 2, or 3 bits): Indicating a CC (or cell) in which a PDSCH allocated by corresponding DCI is transmitted.
Bandwidth part indicator (0, 1, or 2 bits): Indicating a BWP in which a PDSCH allocated by corresponding DCI is transmitted.
Frequency domain resource assignment (a payload is determined according to the frequency axis resource allocation):
Indicating frequency axis resource allocation, wherein $N_{RB}^{DL,BWP}$ indicates a size of an active DL BWP.

For a detailed method, the frequency axis
resource allocation is referred to.
Time domain resource assignment (0 to 4 bits): Indicating time axis resource allocation according to the above description.
VRB-to-PRB mapping (0 or 1 bit): 0 indicates non-interleaved VRB-to-PRB mapping, and 1 indicates
interleaved VRP-to-PRB mapping. 0 bit indicates a case where a vrb-ToPRB-InterleaverForDCI-Format1-2 configuration parameter of a higher layer is not configured.
PRB bundling size indicator (0 or 1 bit): 0 bit if a higher layer parameter of prb-BundlingTypeForDCI-Format1-2 is not configured or is configured
to be "static", and 1 bit if the same is configured to be "dynamic".
Rate matching indicator (0, 1, or 2 bits): Indicating a rate matching pattern. ZP CSI-RS trigger (0, 1, or 2 bits): Indicator that triggers an aperiodic ZP CSI-RS.
Modulation and coding scheme (5 bits): Indicating a modulation order and a coding rate used for PDSCH transmission.
New data indicator (1 bit): Indicating whether a PDSCH corresponds to initial transmission or retransmission, according to toggling.
Redundancy version (0, 1, or 2 bits): Indicating a redundancy version used for PDSCH transmission.
HARQ process number (0, 1, 2, 3, or 4 bits): Indicating an HARQ process number used for PDSCH transmission.
Downlink assignment index (0, 1, 2, or 4 bits): DAI indicator
TPC command for scheduled PUCCH (2 bits): PUCCH power control indicator
PUCCH resource indicator (0, 1, 2, or 3 bits): PUCCH resource indicator which indicates one of resources configured via a higher layer.
PDSCH-to-HARQ_feedback timing indicator (0, 1, 2, or 3 bits): HARQ feedback timing indicator which indicates one of feedback timing offsets configured via a higher layer.
Antenna port (4, 5, or 6 bits): Indicating a DMRS port and a CDM group without data.
Transmission configuration indication (0, 1, 2, or 3 bits): TCI indicator
SRS request (0, 1, 2, or 3 bits): SRS transmission request indicator
DMRS sequence initialization (0 or 1 bit): DMRS scrambling ID selection indicator
Priority indicator (0 or 1 bit): 0 bit if a higher layer priorityIndicatorForDCI-Format1-2 parameter is not configured, and 1 bit if the same is configured.

---

The number of pieces of DCI having different sizes that the terminal is capable of receiving per each slot in a corresponding cell is up to 4. The number of pieces of C-RNTI-scrambled DCIs having different sizes, which can be received by the terminal, is up to three.

The base station may configure, for the terminal, time domain resource allocation information (which may be, for example, information configured in a table form) for a downlink data channel (PDSCH) and an uplink data channel (PUSCH) via higher-layer signaling (e.g., RRC signaling). The base station may configure resource allocation information (e.g., including information in a table form) including 16 (maxNrofDL-Allocations=16) entries for the PDSCH, and may configure information (e.g., including information in a table form) including 16 (maxNrofUL-Allocations=16) entries for the PUSCH. The time domain resource allocation information may include, for example, a PDCCH-to-PDSCH slot timing (denoted as K0, and corresponding to a time interval in units of slots between a time point at which a PDCCH is received and a time point at which a PDSCH scheduled by the received PDCCH is transmitted), a PDCCH-to-PUSCH slot timing (denoted as K2, and corresponding to a time interval in units of slots between a time point at which a PDCCH is received and a time point at which a PUSCH scheduled by the received PDCCH is transmitted), information on a position and length of a start symbol in which the PDSCH or PUSCH is scheduled within a slot, a mapping type of the PDSCH or PUSCH, or the like. For example, information as in Table 9 or Table 10 below may be notified to the terminal by the base station.

TABLE 9

```
PDSCH-TimeDomainResourceAllocationList        ::=          SEQUENCE
(SIZE(1..maxNrofDL-Allocations)) OF PDSCH-TimeDomainResourceAllocation
PDSCH-TimeDomainResourceAllocation ::=        SEQUENCE {
   k0                                             INTEGER(0..32)
OPTIONAL,      -- Need S
   mappingType                                 ENUMERATED {typeA,
typeB},
   startSymbolAndLength                        INTEGER (0..127)
}
```

TABLE 10

```
PDSCH-TimeDomainResourceAllocationList        ::=          SEQUENCE
(SIZE(1..maxNrofDL-Allocations)) OF PDSCH-TimeDomainResourceAllocation
PDSCH-TimeDomainResourceAllocation ::=        SEQUENCE {
   k2                                             INTEGER(0..32)
OPTIONAL,      -- Need S
   mappingType                                 ENUMERATED {typeA,
typeB},
   startSymbolAndLength                        INTEGER (0..127)
}
```

The base station may notify the terminal of one among the entries in the tables relating to the time domain resource allocation information via L1 signaling (e.g., DCI) (e.g., the entry may be indicated by the time domain resource allocation field in the DCI). The terminal may acquire the time domain resource allocation information for the PDSCH or PUSCH, based on the DCI received from the base station.

Hereinafter, a frequency domain resource allocation method for a data channel in the communication system to which the disclosure is applicable will be described.

In the communication system to which the disclosure is applicable, two types of resource allocation type 0 and resource allocation type 1 are supported as a method of indicating frequency domain resource allocation information for a downlink data channel (PDSCH) and an uplink data channel (PUSCH).

In resource allocation type 0, the base station may notify the terminal of RB allocation information in a bitmap form for a resource block group (RBG). In this case, the RBG may include a set of consecutive VRBs, and size P of the RBG may be determined based on a value configured as a higher-layer parameter (rbg-Size) and a size value of a bandwidth part defined as in Table 11.

TABLE 11

| Nominal RBG size P | | |
|---|---|---|
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

A total number ($N_{RBG}$) of RBGs of bandwidth part i having size $$N_{BWP,i}^{size}$$

may be defined as follows.

$$N_{RBG} = \left\lceil \left( N_{BWP,i}^{size} + \left( N_{BWP,i}^{start}, \bmod P \right) \right) / P \right\rceil.$$

where the size of the first RBG is $$RBG \text{ is } RBG_{last}^{size} = P - N_{BWP,i}^{start}, \bmod P,$$

the size of last RBG is $$RGB_{last}^{size} = P - N_{BWP,i}^{start} \bmod P \text{ if } \left(N_{BWP,i}^{start} + N_{BWP,i}^{size}\right) \bmod P > 0,$$

and P otherwise, and the size of all other RBGs is P.

Respective bits of a bitmap having a size of $N_{RBG}$ bits may correspond to respective RBGs. RBGs may be indexed in an ascending order of frequency starting from a lowest frequency position of a bandwidth part. with respect to $N_{RBG}$ RBGs in a bandwidth part, from RBG #0 to RBG #($N_{RBG}-1$) may be mapped from an MSB to an LSB of an RBG bitmap. If a specific bit value in the bitmap is 1, the terminal may determine that an RBG corresponding to the bit value has been assigned, and if the specific bit value in the bitmap is 0, the terminal may determine that an RBG corresponding to the bit value has not been assigned.

In resource allocation type 1, the base station may notify the terminal of RB allocation information as information on start positions and lengths for consecutively allocated VRBs. In this case, interleaving or non-interleaving may be additionally applied to the consecutively allocated VRBs. A resource allocation field of resource allocation type 1 may include a resource indication value (RIV), and the RIV may include a VRB start point ($RB_{start}$) and a length ($L_{RBs}$) of consecutively allocated RBs. More specifically, an RIV in a bandwidth part having a size of $$N_{BWP}^{size}$$

may be defined as follows.

$$\text{if } (L_{RBs} - 1) \leq \lfloor N_{BWP}^{size}/2 \rfloor,$$

$$RIV = N_{BWP}^{size}(L_{RBs} - 1) + RB_{start}$$

$$\text{else,}$$

$$RIV = N_{BWP}^{size}\left(N_{BWP}^{size} + L_{RBs} - 1\right) + \left(N_{BWP}^{size} - 1 - RB_{start}\right)$$

$$\text{where } L_{RBs} \geq 1 \text{ and does not exceed } N_{BWP}^{size} - RB_{start}.$$

Figure 9:
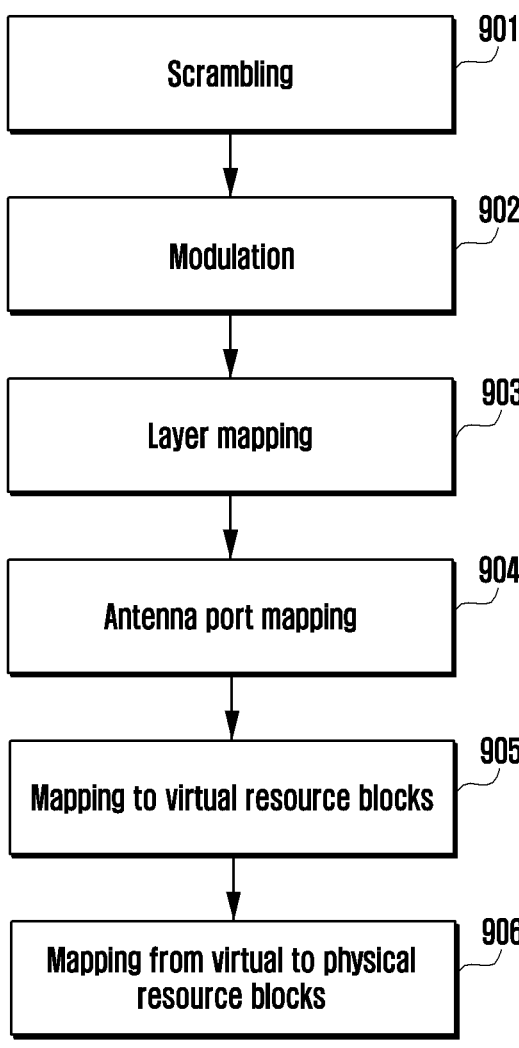
FIG. 9 is a diagram illustrating an example of downlink data channel (physical downlink shared channel (PDSCH)) processing in the communication system according to an embodiment of the disclosure.

FIG. 9 is a diagram illustrating an example of downlink data channel (physical downlink shared channel (PDSCH)) processing in the communication system according to an embodiment of the disclosure.

Scrambling may be performed on one codeword or each of two codewords in operation 901. Sequence $$\tilde{b}^{(q)}(0), \ldots, \tilde{b}^{(q)}\left(M_{bit}^{(q)} - 1\right)$$

may be acquired by scrambling sequence $$b^{(q)}(0), \ldots, b^{(q)}\left(M_{bit}^{(q)} - 1\right)$$

of codeword q having a length of $$M_{bit}^{(q)}$$

via the same procedure as in Equation 2 by using scrambling sequence $c^{(q)}(i)$ obtained via initialization as in Equation 3. A value of $n_{ID}$ may be configured via a higher-layer parameter, otherwise, $$N_{ID}^{cell}$$

may be determined as a cell ID value, and $N_{RNTI}$ may refer to an RNTI associated with PDSCH transmission.

$$\tilde{b}^{(q)}(i) = \left(b^{(q)}(i) + c^{(q)}(i)\right) \bmod 2 \qquad \text{Equation 2}$$

$$c_{init} = n_{RNTI} \cdot 2^{15} + q \cdot 2^{14} + n_{ID} \qquad \text{Equation 3}$$

Modulation symbol sequence $$d^{(q)}(0), \ldots, d^{(q)}\left(M_{symb}^{(q)} - 1\right)$$

having a length of $$M_{symb}^{(q)}$$

may be generated using one of various modulation schemes supported by a wireless communication system and sequence $$b^{(q)}(0), \ldots, b^{(q)}\left(M_{bit}^{(q)} - 1\right)$$

of scrambled bits, in operation 902.

$$M_{symb}^{layer}$$

modulation symbols may be mapped to each layer of v layers in operation 903, and this may be expressed as $x(i) = \left[x^{(0)}(i) \ldots x^{(v-1)}(i)\right]^T$. Table 12 shows the number of layers, the number of codewords, and a codeword-layer mapping relationship.

TABLE 12

| Number of layers | Number of codewords | Codeword-to-layer mapping $i = 0, 1, \ldots, M_{symb}^{layer} - 1$ |
|---|---|---|
| 1 | 1 | $x^{(0)}(i) = d^{(0)}(i)$ $M_{symb}^{layer} = M_{symb}^{(0)}$ |
| 2 | 1 | $x^{(0)}(i) = d^{(0)}(2i)$ $M_{symb}^{layer} = M_{symb}^{(0)}/2$ |
| | | $x^{(1)}(i) = d^{(0)}(2i + 1)$ |
| 3 | 1 | $x^{(0)}(i) = d^{(0)}(3i)$ $M_{symb}^{layer} = M_{symb}^{(0)}/3$ |
| | | $x^{(1)}(i) = d^{(0)}(3i + 1)$ |
| | | $x^{(2)}(i) = d^{(0)}(3i + 2)$ |
| 4 | 1 | $x^{(0)}(i) = d^{(0)}(4i)$ $M_{symb}^{layer} = M_{symb}^{(0)}/4$ |
| | | $x^{(1)}(i) = d^{(0)}(4i + 1)$ |
| | | $x^{(2)}(i) = d^{(0)}(4i + 2)$ |
| | | $x^{(3)}(i) = d^{(0)}(4i + 3)$ |
| 5 | 2 | $x^{(0)}(i) = d^{(0)}(2i)$ $M_{symb}^{layer} = M_{symb}^{(0)}/2 = M_{symb}^{(1)}/3$ |

TABLE 12-continued

| Number of layers | Number of codewords | Codeword-to-layer mapping $i = 0, 1, \ldots, M_{symb}^{layer} - 1$ |
|---|---|---|
| 6 | 2 | $x^{(1)}(i) = d^{(0)}(2i + 1)$ $x^{(2)}(i) = d^{(1)}(3i)$ $x^{(3)}(i) = d^{(1)}(3i + 1)$ $x^{(4)}(i) = d^{(1)}(3i + 2)$ $x^{(0)}(i) = d^{(0)}(3i)$ $M_{symb}^{layer} = M_{symb}^{(0)}/3 = M_{symb}^{(1)}/3$ |
| 7 | 2 | $x^{(1)}(i) = d^{(0)}(3i + 1)$ $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ $x^{(0)}(i) = d^{(0)}(3i)$ $M_{symb}^{layer} = M_{symb}^{(0)}/3 = M_{symb}^{(1)}/4$ |
| 8 | 2 | $x^{(1)}(i) = d^{(0)}(3i + 1)$ $x^{(2)}(i) = d^{(0)}(3i + 2)$ $x^{(3)}(i) = d^{(1)}(4i)$ $x^{(4)}(i) = d^{(1)}(4i + 1)$ $x^{(5)}(i) = d^{(1)}(4i + 2)$ $x^{(6)}(i) = d^{(1)}(4i + 3)$ $x^{(0)}(i) = d^{(0)}(4i)$ $M_{symb}^{layer} = M_{symb}^{(0)}/4 = M_{symb}^{(1)}/4$ $x^{(1)}(i) = d^{(0)}(4i + 1)$ $x^{(2)}(i) = d^{(0)}(4i + 2)$ $x^{(3)}(i) = d^{(0)}(4i + 3)$ $x^{(4)}(i) = d^{(1)}(4i)$ $x^{(5)}(i) = d^{(1)}(4i + 1)$ $x^{(6)}(i) = d^{(1)}(4i + 2)$ $x^{(7)}(i) = d^{(1)}(4i + 3)$ |

Modulation symbols mapped to a layer may be mapped to an antenna port as in Equation 4. $\{p_0, \ldots, p_{v-1}\}$ may be determined by information included in the DCI format, in operation 904.

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix} \quad \text{Equation 4}$$

In this case, $$i = 0, 1, \ldots, M_{symb}^{ap} - 1, \text{ and } M_{symb}^{ap} = M_{symb}^{layer}.$$

$$y^{(p)}(0), \ldots, y^{(p)}(M_{symb}^{ap} - 1)$$

symbols having completed the procedures above may be mapped, in operation 905, to REs satisfying conditions (e.g., mapping is not possible for DM-RS resources, etc.) that may be used for PDSCH transmission from among REs in VRBs allocated for transmission.

VRBs having completed the procedures above may be mapped to PRBs via an interleaving mapping scheme or a non-interleaving mapping scheme, in operation 906. The mapping scheme may be indicated via a VRB-to-PRB mapping field in DCI, wherein absence of a mapping scheme indication may refer to a non-interleaving mapping scheme.

In case that the non-interleaving mapping scheme is used, VRB n may be mapped to PRB n except for a specific case. For example, the specific case may include a case in which VRB n of a PDSCH scheduled using DCI format 1_0 via a common search space is mapped to $$PRB \; n + N_{start}^{CORESET} \left( N_{start}^{CORESET} \right.$$

refers to a first PRB of CORESET to which the DCI is transmitted).

In case that the interleaving mapping scheme is used, RBs in a BWP may be divided into $N_{bundle}$ RB bundles, and the RB bundles may be mapped via the scheme as in Table 13.

An example of dividing the RBs in the BWP into $N_{bundle}$ RB bundles may be as follows. A set of $$N_{BWP,i}^{size}$$

RBs in a BWP having starting point $$N_{BWP,i}^{size}$$

is divided into $$N_{bundle} = \left\lceil \left( N_{BWP,i}^{size} + \left( N_{BWP,i}^{start} \bmod L_i \right) \right) / L_i \right\rceil$$

RB bundles, and the RB bundles may be indexed in ascending (increasing) order. Here, Li denotes a bundle size in BWP i, which may be transmitted to the terminal by the higher-layer parameter vrb-ToPRB-Interleaver. In addition, RB bundle 0 may include $$L_i - \left( N_{BWP,j}^{start} \bmod L_i \right) RBs, \text{ and if } \left( N_{BWP,j}^{start} + N_{BWP,i}^{start} \right) \bmod L_i > 0$$

is satisfied, RB bundle $N_{bundle}-1$ may include $$\left( N_{BWP,j}^{start} + N_{BWP,i}^{start} \right) \bmod L_i$$

RBs, otherwise, RB bundle $N_{bundle}-1$ may include Li RBs. In addition, the remaining RB bundles may include Li RBs.

TABLE 13

VRBs in j ∈ {0, 1, . . . , $N_{bundle}$ − 1} may be mapped to PRBs as follows.
VRB bundle $N_{bundle}$ − 1 may be mapped to PRB bundle $N_{bundle}$ − 1.
The remaining VRB bundles j ∈ {0, 1, . . . , $N_{bundle}$ − 2} may be mapped to PRB bundle f(j) in the same manner as in Equation 5.

$$f(j) = rC + c \quad \text{Equation 5}$$
$$j = cR + r$$
$$r = 0, 1, \ldots, R - 1$$
$$c = 0, 1, \ldots, C - 1$$
$$R = 2$$
$$C = \lfloor N_{bundle}/R \rfloor$$

In the communication system according to an embodiment of the disclosure, an MCS index for a PDSCH, i.e., modulation order (or scheme) Qm and target code rate R, may be determined via the following procedures.

MCS Index Table Determining Method

With respect to a PDSCH scheduled via a PDCCH (PDCCH with DCI format 1_0, format 1_1, or format 1_2 with CRC scrambled by C-RNTI, MCS-C-RNTI, TC-RNTI, CS-RNTI, SI-RNTI, RA-RNTI, MSGB-RNTI, or P-RNTI) including DCI (e.g., DCI format 1_0, DCI format 1_1, or DCI format 1_2) with a CRC scrambled by a C-RNTI, an MCS-C-RNTI, a TC-RNTI, a CS-RNTI, an SI-RNTI, an RA-RNTI, an MSGB-RNTI, or a P-RNTI, or with respect to a PDSCH scheduled using PDSCH configuration SPS-Config (or SPS configuration) provided from a higher layer without corresponding PDCCH transmission, (a) If higher-layer parameter mcs-Table given by PDSCH-Config is configured to be "qam256", and the PDSCH is scheduled by a PDCCH of DCI format 1_1 with a CRC scrambled by a C-RNTI (if the higher-layer parameter mcs-Table given by PDSCH-Config is set to "qam256", and the PDSCH is scheduled by a PDCCH with DCI format 1_1 with CRC scrambled by C-RNTI), the terminal may use the MCS index IMCS value of [Table 15] to determine modulation order Qm and target code rate R.

(b) If the condition of (a) is not satisfied, the UE is not configured by an MCS-C-RNTI (UE is not configured with MCS-C-RNTI), higher-layer parameter mcs-Table given by PDSCH-Config is configured to be "qam64LowSE", and the PDSCH is scheduled by a PDCCH in a UE-Specific search space with a CRC scrambled by a C-RNTI (if the UE is not configured with MCS-C-RNTI, the higher-layer parameter mcs-Table given by PDSCH-Config is set to "qam64LowSE", and the PDSCH is scheduled by a PDCCH with a DCI format other than DCI format 1_2 in a UE-specific search space with CRC scrambled by C-RNTI), the UE may use the MCS index IMCS value of [Table 16] to determine modulation order Qm and target code rate R.

(c) If the conditions of (a) and (b) are not satisfied, the UE is configured by an MCS-C-RNTI, and the PDSCH is scheduled by a PDCCH to which a CRC scrambled by the MCS-C-RNTI is applied (if the UE is configured with MCS-C-RNTI, and the PDSCH is scheduled by a PDCCH with CRC scrambled by MCS-C-RNTI), the UE may use the MCS index IMCS value of [Table 16] to determine modulation order Qm and target code rate R.

(d) If the conditions of (a), (b), and (c) are not satisfied, the UE is not configured by higher-layer parameter mcs-Table given by SPS-Config, and higher-layer parameter mcs-Table given by PDSCH-Config is set to "qam256" (if the UE is not configured with the higher-layer parameter mcs-Table given by SPS-Config, and the higher-layer parameter mcs-Table given by PDSCH-Config is set to "qam256"), (d-1) If the PDSCH is scheduled by a PDCCH of DCI format 1_1 to which a CRC scrambled by a CS-RNTI is applied (if the PDSCH is scheduled by a PDCCH with DCI format 1_1 with CRC scrambled by CS-RNTI or), or (d-2) If the PDSCH is scheduled without corresponding PDCCH transmission using SPS-Config, The terminal may use the MCS index IMCS value of [Table 15] to determine modulation order Qm and target code rate R.

(e) If the conditions of (a), (b), (c), and (d) are not satisfied, and the UE is configured by setting higher-layer parameter mcs-Table given by SPS-Config to be qam64LowSE (if the UE is configured with the higher-layer parameter mcs-Table given by SPS-Config set to "qam64LowSE"), (e-1) If the PDSCH is scheduled by a PDCCH to which a CRC scrambled by a CS-RNTI is applied (if the PDSCH is scheduled by a PDCCH with CRC scrambled by CS-RNTI), or (e-2) If the PDSCH is scheduled without corresponding PDCCH transmission using SPS-Config (if the PDSCH is scheduled without corresponding PDCCH transmission using SPS-Config), The UE may use the MCS index IMCS value of [Table 16] to determine modulation order Qm and target code rate R.

(f) If the conditions of (a), (b), (c), (d), and (e) are not satisfied, the UE may use the MCS index IMCS value of [Table 14] to determine modulation order Qm and target code rate R.

TABLE 14

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 15

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |

TABLE 15-continued

| MCS Index $I_{MCS}$ | Modulation Order $Q_m$ | Target code Rate R × [1024] | Spectral efficiency |
|---|---|---|---|
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 16

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

Figure 10:
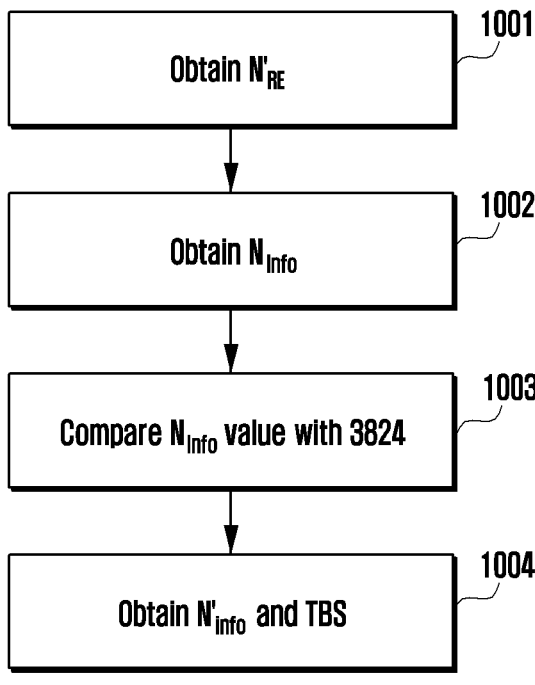
FIG. 10 is a diagram illustrating an example of a method of acquiring a transport block size (TBS) of a transport block (TB) in the communication system according to an embodiment of the disclosure.

FIG. 10 is a diagram illustrating an example of a method of acquiring a transport block size (TBS) of a transport block (TB) in the communication system according to an embodiment of the disclosure.

A terminal may first acquire (determine or calculate) the number (NRE) of REs in a slot in operation 1001. The terminal may acquire (calculate) N'RE which is the number of REs allocated to PDSCH mapping in a PRB within allocated resources. N'RE may be calculated by $$N_{SC}^{RB} \cdot N_{symb}^{sh} - N_{DMRS}^{PRB} - N_{oh}^{PRB}.$$

Here, $$N_{SC}^{RB}$$

is 12, and $$N_{symb}^{sh}$$

may indicate the number of OFDM symbols allocated to a PDSCH.

$$N_{DMRS}^{PRB}$$

is the number of DMRS REs of the same CDM group within one PRB.

$$N_{oh}^{PRB}$$

is the number of REs occupied by overhead in the one PRB configured by higher signaling, and may be configured to be one of 0, 6, 12, and 18 (may be configured to be 0 if not configured by higher signaling).

In addition, a total number (NRE) of REs allocated to the PDSCH may be calculated. NRE is calculated based on $$\min(156, N_{RE}') \cdot n_{PRB},$$

and nPRB indicates the number of PRBs allocated to the terminal. A value of NRE may be calculated as above. Alternatively, information (e.g., the information may be configured in the form of at least one table) including the number of all cases that may be configured to be the value of NRE is stored, and the NRE value may be acquired from the stored information (e.g., table) via at least one parameter value among $$N_{SC}^{RB}, N_{symb}^{sh}, N_{DMRS}^{PRB} \text{ and } N_{oh}^{PRB}, n_{PRB}.$$

In addition, the terminal may acquire (calculate) the number ($N_{info}$) of temporary information bits in operation 1002. For example, the number Ninfo of the temporary information bits may be calculated by $N_{RE} \cdot R \cdot Q_m \cdot v$. Here, R denotes a code rate, Qm denotes a modulation order, and the information may be determined based on modulation and coding scheme (MCS) information included in control information (e.g., DCI, RRC configuration information, etc.). Specifically, previously agreed information (e.g., MCS index tables, such as Tables 12, 13, and 14) may be used for the code rate and the modulation order, and the code rate and the modulation order may be determined based on the MCS information and the previously agreed information. v may denote the number of allocated layers. The value $N_{info}$ may be calculated as above, or information (in the form of at least one table) including the number of all cases is stored, and a value may be acquired from the stored information via at least one parameter value among R, Qm, and v.

The terminal may compare the acquired (calculated) value of $N_{info}$ with a value of 3824 in operation 1003. Depending on whether the value of $N_{info}$ is equal to or smaller than 3824 or is larger than 3824, N'info and a TBS may be acquired (calculated) in a different way in operation 1004.

If $N_{info} \leq 3824$, $N'_{info}$ may be calculated via equations $$N'_{info} = \max\left(24, 2^n \left\lfloor \frac{N_{info}}{2^n} \right\rfloor\right)$$

and $n = \max(3, \lfloor \log_2(N_{info}) \rfloor - 6)$. The value $N'_{info}$ may be calculated as above, or information (e.g., at least one table) including the number of all cases is stored, and the $N'_{info}$ value may be acquired from the stored information via at least one parameter value among $N'_{info}$ and v. A TBS may be determined to be a value closest to $N'_{info}$ among values not smaller than $N'_{info}$ in Table 17.

TABLE 17

| Index | TBS |
| --- | --- |
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |

TABLE 17-continued

| Index | TBS |
| --- | --- |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

$N_{info} > 3824$, $N'_{info}$ may be calculated via equations of $$N'_{info} = \max\left(3840, 2^n \times \text{round}\left(\frac{N_{info} - 24}{2^n}\right)\right)$$

and $n = \lfloor \log_2(N_{info} - 24) \rfloor - 5$. The value $N'_{info}$ may be calculated as above, or information (e.g., at least one table) including the number of all cases is stored, and the $N'_{info}$ value may be acquired from the stored information via at least one parameter value among $N'_{info}$ and v. A TBS may be determined via the $N'_{info}$ value and the pseudo code included in Table 18 or another type of pseudo code that produces the same result. Alternatively, for the TBS, information (e.g., at least one table) on the number of all cases is stored, and a TBS value may be acquired from the stored information via at least one parameter value among R, $N'_{info}$, and C.

TABLE 18

If R ≤ 1/4

$$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil$$

else
If $N_{info}' > 8424$

TABLE 18-continued $$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil$$

else $$TBS = 8 \cdot \left\lceil \frac{N'_{info} + 24}{8} \right\rceil - 24$$

end if
end if

In the communication system to which the disclosure is applicable, a maximum data rate supported by the terminal may be determined via Equation 6.

$$\text{data rate (in } Mbps) =$$

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot \left(1 - OH^{(j)}\right) \right)$$

Equation 6

In Equation 6, J may denote the number of carriers bound by carrier, aggregation, Rmax=948/1024, $$v_{Layers}^{(j)}$$

may denote the maximum number of layers, $$Q_m^{(j)}$$

may denote a maximum modulation order, $f^{(j)}$ may denote a scaling index, and μ may denote a subcarrier spacing. The terminal may configure and report $f^{(j)}$ as one of 1, 0.8, 0.75, and 0.4, and μ may be given as in Table 19.

TABLE 19

| μ | Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

$$T_s^\mu$$

is an average OFDM symbol length, $$T_s^\mu$$

may be calculated based on $$\frac{10^{-3}}{14 \cdot 2^\mu},$$

and $$N_{PRB}^{BW(j),\mu}$$

is the maximum number of RBs in BW(j). $OH^{(j)}$ is an over-head value, and may be given as 0.14 in a downlink of FR1 (a band equal to or lower than 6 GHZ) and 0.18 in an uplink of FR1, and may be given as 0.08 in a downlink of FR2 (a band higher than 6 GHZ) and 0.10 in an uplink of FR2. For example, based on Equation 6, a maximum data rate in a downlink in a cell having a frequency bandwidth of 100 MHz at a subcarrier spacing of 30 kHz may be as shown in Table 20 below.

TABLE 20

| $f^{(j)}$ | $v_{Layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

An actual data rate indicating an actual data transmission efficiency may be a value obtained by dividing the amount of transmitted data by a data transmission time. That is, an actual data rate may be a value obtained by dividing a TBS by a transmission time interval (TTI) length in transmission of 1 TB, or a value obtained by dividing the sum of two TBSs by a TTI length in transmission of the two TBSs. A maximum actual downlink data rate in a cell having a subcarrier spacing of 30 kHz and a frequency bandwidth of 100 MHz may be determined as shown in Table 21 below according to the number of assigned PDSCH symbols.

TABLE 21

| $N_{symb}^{sh}$ | $N_{DMRS}^{PRB}$ | $N_{RE}$ | $N_{RE}$ | $N_{info}$ | n | $N'_{info}$ | C | TBS | TTI length (ms) | Data rate (Mbps) |
|---|---|---|---|---|---|---|---|---|---|---|
| 3 | 8 | 28 | 7644 | 226453.5 | 12 | 225.280 | 27 | 225.480 | 0.107143 | 2.104.48 |
| 4 | 8 | 40 | 10920 | 323505.0 | 13 | 319.488 | 38 | 319.784 | 0.142857 | 2.238.49 |
| 5 | 8 | 52 | 14196 | 420556.5 | 13 | 417.792 | 50 | 417.976 | 0.178571 | 2.340.67 |
| 6 | 8 | 64 | 17475 | 517608.0 | 13 | 516.096 | 62 | 516.312 | 0.214286 | 2.409.46 |
| 7 | 8 | 76 | 20748 | 711711.0 | 14 | 622.592 | 74 | 622.760 | 0.250000 | 2.491.04 |
| 8 | 8 | 88 | 24024 | 808762.5 | 14 | 704.512 | 84 | 704.904 | 0.285714 | 2.467.16 |
| 9 | 8 | 100 | 27300 | 905814.0 | 14 | 802.816 | 96 | 803.304 | 0.321429 | 2.499.17 |
| 10 | 8 | 112 | 30576 | 1002865.5 | 14 | 901.120 | 107 | 901.344 | 0.357143 | 2.523.76 |
| 11 | 8 | 124 | 33852 | 1099917.0 | 14 | 999.424 | 119 | 999.576 | 0.392857 | 2.544.38 |
| 12 | 8 | 136 | 37128 | 1196968.5 | 15 | 1,114.112 | 133 | 1,115.048 | 0.428571 | 2.601.78 |

TABLE 21-continued

| $N_{symb}^{sh}$ | $N_{DMRS}^{PRB}$ | $N_{RE}$ | $N_{RE}$ | $N_{info}$ | n | $N'_{info}$ | C | TBS | TTI length (ms) | Data rate (Mbps) |
|---|---|---|---|---|---|---|---|---|---|---|
| 13 | 8 | 148 | 40404 | 1294020.0 | 15 | 1,121.146 | 144 | 1,213.032 | 0.464286 | 2.612.68 |
| 14 | 8 | 160 | 43680 | | 15 | 1,277.952 | 152 | 1,277.992 | 0.500000 | 2.255.98 |

Referring to the maximum data rates supported by the terminal as in Table 20 and the actual data rates according to the allocated TBS as in Table 21, it may be identified that there is a case in which an actual data rate is higher than a maximum data rate supported by the terminal according to scheduling information.

In the communication system to which the disclosure is applicable, a data rate supportable by the terminal may be determined (calculated or acquired) between the base station and the terminal by using a maximum frequency band, a maximum modulation order, and a maximum number of layers, which are supported by the terminal. However, the data rate supportable by the terminal may be different from an actual data rate calculated based on a TBS and a TTI, and in some cases, there may be a case in which the base station transmits, to the terminal, data having a larger TBS than the data rate supportable by the terminal.

In the communication system to which the disclosure is applicable, the terminal may transmit or receive downlink data by receiving data via a scheduled PDSCH. If the number of terminals is large or the number of PDSCHs to be scheduled is large, overhead on the physical downlink control channel (PDCCH) on which the DCI is transmitted may increase. In order to solve this problem, the base station may configure semi-persistent scheduling (SPS) for the terminal, and may schedule and transmit the PDSCH according to the SPS configuration, thereby reducing overhead.

According to an embodiment of the disclosure, the base station may configure configuration information for the SPS for the terminal via higher-layer signaling (e.g., higher-layer signaling may be referred to as a higher-layer signal, radio resource control (RRC) signaling, or an RRC message). For example, the configuration information may be transmitted to the terminal via SPS-Config IE. The configuration information may include, for example, at least information as in Table 22. The base station may configure at least one SPS for the terminal by using, for example, the configuration information as in Table 22, according to capability of the terminal. In case that multiple SPSs are configured for the terminal, the multiple SPSs may be distinguished by sps-ConfigIndex of Table 22. According to the disclosure, sps-ConfigIndex may be referred to as an SPS index. SPS configuration (or SPS configuration information) may be performed per each BWP of a serving cell, and multiple SPSs may be configured and activated concurrently within the same BWP.

TABLE 22

```
SPS-Config information element
SPS-Config ::=                    SEQUENCE {
    periodicity                   ENUMERATED {ms10, ms20,
ms32, ms40, ms64, ms80, ms128, ms160, ms320, ms640,
spare6, spare5, spare4, spare3, spare2, spare1},(DL SPS period)
    nrofHARQ-Processes            INTEGER(1..8),(The number
of HARQ processes configured for DL SPS)
    n1PUCCH-AN                    PUCCH-ResourceId
```

TABLE 22-continued

```
OPTIONAL, -- Need M(Configure format0 or format1 and HARQ
resource of PUCCH for DL SPS)
    mcs-Table                          ENUMERATED
{qam64LowSE}
OPTIONAL, -- Need S(MCS table-related configuration information
used for DL SPS)
    ...,
    [[
    sps-ConfigIndex-r16                SPS-ConfigIndex-r16
OPTIONAL, -- Cond SPS-List(Index for configuration of multiple
SPSs)
    harq-ProcID-Offset-r16             INTEGER(0..15)
OPTIONAL, -- Need R(Offset used when deriving HARQ process ID)
    periodicityExt-r16                 INTEGER(1..5120)
OPTIONAL, -- Need R(DL SPS period, if this field exists, periodicity
field is ignored)
    harq-CodebookID-r16                INTEGER(1..2)
OPTIONAL, -- Need R(HARQ-ACK codebook index corresponding to
HARQ-ACK codebook for SPS PDSCH and SPS PDSCH release)
    pdsch-AggregationFactor-r16     ENUMERATED {n1, n2, n4,
n8                                                           }
OPTIONAL-- Need S(The number of repetitions of SPS PDSCH, if
this field does not exist, PDSCH aggregation factor of PDSCH-Config. is
used)      ]]
}
```

In order to solve problems related to overhead and latency that may occur according to resource allocation for frequent uplink transmission, the base station may configure, for the terminal, a specific resource for uplink transmission and may enable the terminal to perform uplink transmission using the specific resource. Here, the specific resource may be referred to as a configured grant.

According to an embodiment of the disclosure, the base station may configure, for the terminal, configuration information on a configured grant via higher-layer signaling. For example, the configuration information may be transferred to the terminal via ConfiguredGrantConfig IE. For the configuration information, at least one configured grant may be configured using, for example, at least the configuration information as in Table 23. In case that multiple configured grants are configured for the terminal, the multiple configured grants may be distinguished by configuredGrantConfigIndex and/or configuredGrantConfigIndexMAC of Table 23. In this disclosure, configuredGrantConfigIndex and/or configuredGrantConfigIndexMAC may be referred as ConfiguredGrant. ConfiguredGrant configuration (or to ConfiguredGrant configuration information) may be performed per each BWP of a serving cell, and multiple configured grants may be configured and activated concurrently within the same BWP. According to an embodiment of the disclosure, there may be two types of the configured grant, which are type 1 and type 2. In the disclosure, type 1 configured grant may refer to a configured grant in which all configuration values (e.g., including rrc-ConfiguredUplinkGrant in Table 23) of the corresponding configured grant are transferred via RRC signaling so that there is no other base station control. That is, once type 1 configured grant is configured without a separate activation or deactivation procedure, type 1 configured grant is applied until the configuration for the corresponding configured grant is released. In the disclosure, for type 2 configured grant, some configuration (e.g., not including rrc-ConfiguredUplinkGrant of Table 23) of the configured grant is transferred via RRC signaling, and after configuration, the base station may transfer an MAC CE or DCI for activation of the configured grant, thereby actually activating type 2 configured grant, so that the terminal may use the same to transmit uplink data.

TABLE 23

```
ConfiguredGrantConfig information element
ConfiguredGrantConfig ::=                    SEQUENCE {
    frequencyHopping                         ENUMERATED {intraSlot,
interSlot}                                   OPTIONAL,      --
Need S(Frequency hopping configuration)
    cg-DMRS-Configuration                    DMRS-UplinkConfig,(DMRS
configuration)
    mcs-Table                                ENUMERATED {qam256,
qam64LowSE}                                              OPTIONAL,
-- Need S(MCS table-related configuration information used in
ConfiguredGrant)
    mcs-TableTransformPrecoder               ENUMERATED {qam256,
qam64LowSE}                                              OPTIONAL,
-- Need S(MCS table-related configuration information used in
ConfiguredGrant)
    uci-OnPUSCH                              SetupRelease { CG-UCI-
OnPUSCH }                                                OPTIONAL,
-- Need M(UCI-related beta-offset configuration information transmitted on
PUSCH)
    resourceAllocation                                   ENUMERATED
{        resourceAllocation Type0,          resourceAllocationType1,
dynamicSwitch },(Resource allocation type configuration information)
    rbg-Size                                 ENUMERATED {config2}
OPTIONAL,      -- Need S(RBG size configuration information for PUSCH)
    powerControlLoopToUse                    ENUMERATED {n0,
n1},(Power control configuration information)
    p0-PUSCH-Alpha                           P0-PUSCH-AlphaSetId,(p0-
PUSCH-AlphaSet index information)
    transformPrecoder                        ENUMERATED {enabled,
disabled}                                                OPTIONAL,      -
- Need S(Configuration information for whether transform precoding is enabled)
    nrofHARQ-Processes                       INTEGER(1 .. 16),(The
number of HARQ processes)
    repK                                     ENUMERATED {n1, n2, n4,
n8},(repetition times)
    repK-RV                                  ENUMERATED {s1-0231,
s2-0303, s3-0000}                                        OPTIONAL,      --
Need R(RV sequence to use)
    periodicity                              ENUMERATED {
                                                 sym2,        sym7,
sym1x14, sym2x14, sym4x14, sym5x14, sym8x14, sym10x14, sym16x14,
sym20x14,
                                                 sym32x14,
sym40x14, sym64x14, sym80x14, sym128x14, sym160x14, sym256x14,
sym320x14, sym512x14,
                                                 sym640x14,
sym1024x14, sym1280x14, sym2560x14,
sym5120x14,
                                                 sym6,        sym1x12,
sym2x12, sym4x12, sym5x12, sym8x12, sym10x12, sym16x12, sym20x12,
sym32x12,
                                                 sym40x12,
sym64x12, sym80x12, sym128x12, sym160x12, sym256x12, sym320x12,
sym512x12, sym640x12,
                                                 sym1280x12,
sym2560x12
    },(Period information)
    configuredGrantTimer                                 INTEGER(1..64)
OPTIONAL, -- Need R(ConfiguredGrant timer configuration information)
rrc-ConfiguredUplinkGrant                    SEQUENCE {(Configuration
information for type1)
    timeDomainOffset
INTEGER(0..5119),(Offset information to reference SFN)
    timeDomainAllocation                     INTEGER(0.. 15),(Time
axis allocation information)
    frequencyDomainAllocation                            BIT
STRING(SIZE(18)),(Frequency axis allocation information)
    antennaPort
INTEGER(0..31),(Antenna port)
    dmrs-SeqInitialization                   INTEGER(0.. 1)
OPTIONAL,      -- Need R(DMRS sequence-related configuration information)
    precodingAndNumberOfLayers
INTEGER(0..63),(Precoding and layer configuration information)
    srs-ResourceIndicator                    INTEGER(0.. 15)
```

TABLE 23-continued

```
OPTIONAL, -- Need R(SRS resource indication information)
    mcsAndTBS
INTEGER(0..31),(Modulation order, code rate, TB size configuration
information)
    frequencyHoppingOffset                    INTEGER(1 ..
maxNrofPhysicalResourceBlocks-1)
OPTIONAL, -- Need R(Frequency hopping offset configuration information)
    pathlossReferenceIndex
INTEGER(0..maxNrofPUSCH-PathlossReferenceRSs-1), (Passloss   reference
index)
    ...,
    [[
    pusch-RepTypeIndicator-r16                 ENUMERATED {pusch-
RepTypeA,pusch-RepTypeB}
OPTIONAL, -- Need M(PUSCH repetition type configuration information)
    frequencyHoppingPUSCH-RepTypeB-r16         ENUMERATED
{interRepetition,                                        interSlot}
OPTIONAL,      -- Cond RepTypeB(Frequency hopping configuration
information of PUSCH repetition type B)
    timeReferenceSFN-r16                       ENUMERATED
{sfn512}
OPTIONAL -- Need S(SFN configuration information used to determine
time axis offset)
    ]]
    }
OPTIONAL, -- Need R ...,
    [[
    cg-RetransmissionTimer-r16                 INTEGER(1 .. 64)
OPTIONAL, -- Need R(Retransmit timer)
    cg-minDFI-Delay-r16                        ENUMERATED
                                               {sym7,
sym1x14, sym2x14, sym3x14, sym4x14, sym5x14, sym6x14, sym7x14,
sym8x14,
                                                         sym9x14,
sym10x14, sym11x14, sym12x14, sym13x14, sym14x14, sym15x14, sym16x14
                                               }
OPTIONAL, -- Need R(Minimum delay-related configuration information of
downlink feedback indication transmission)
cg-nrofPUSCH-InSlot-r16                        INTEGER(1 .. 7)
OPTIONAL, -- Need R(The number of consecutive PUSCH configurations
in one slot)
    cg-nrofSlots-r16                           INTEGER(1..40)
OPTIONAL,      -- Need R(The number of allocated slots)
    cg-StartingOffsets-r16                     CG-StartingOffsets-r16
OPTIONAL,      -- Need R(ConfiguredGrantConfig start offset configuration
information)
    cg-UCI-Multiplexing-r16                    ENUMERATED {enabled}
OPTIONAL,      -- Need R(CG-UCI multiplexing configuration information)
    cg-COT-SharingOffset-r16                   INTEGER(1..39)
OPTIONAL,      -- Need R(CG-COT shared offset configuration information)
    betaOffsetCG-UCI-r16                       INTEGER(0..31)
OPTIONAL,      -- Need R(betaoffset configuration information)
    cg-COT-SharingList-r16
SEQUENCE(SIZE(1 .. 1709))       OF             CG-COT-Sharing-r16
OPTIONAL,      -- Need R(CG-COT shared list configuration information)
    harq-ProcID-Offset-r16                     INTEGER(0.. 15)
OPTIONAL,      -- Need M(HARQ process ID offset configuration information)
    harq-ProcID-Offset2-r16                    INTEGER(0.. 15)
OPTIONAL,      -- Need M(HARQ process ID offset configuration information)
    configuredGrantConfigIndex-r16
ConfiguredGrantConfigIndex-r16
OPTIONAL,      -- Cond CG-List(ConfiguredGrantConfig index configuration
information)
    configuredGrantConfigIndexMAC-r16
ConfiguredGrantConfigIndexMAC-r16
OPTIONAL,      -- Cond CG-IndexMAC(ConfiguredGrantConfig MAC index
configuration information)
    periodicityExt-r16                         INTEGER(1..5120)
OPTIONAL,      -- Need R(Period configuration information)
    startingFromRV0-r16                        ENUMERATED {on, off}
OPTIONAL,      -- Need R(Determining initial transmission time point in given
RV sequence)
    phy-PriorityIndex-r16                      ENUMERATED {p0, p1}
OPTIONAL,      -- Need R(PHY priority for PHY collision resolution)
    autonomous Tx-r16                          ENUMERATED
```

TABLE 23-continued

```
{enabled}                                    OPTIONAL     --
Cond LCH-BasedPrioritization (autonomousTx configuration information)
    ]]
}
```

The base station may indicate activation, deactivation, or release for at least one ConfiguredGrant (type2) or at least one SPS among ConfiguredGrant (type2) or configured SPS to the terminal via a control signal (e.g., DCI or an MAC CE). Here, ConfiguredGrant (type2) may refer to type 2 configured grant described above. For example, the base station may configure at least one specific field in DCI to have a specific value, may scramble, by a specific RNTI, a CRC generated via the DCI, and may transmit the DCI to the terminal via a PDCCH, thereby indicating activation, deactivation, or release of the SPS or ConfiguredGrant (type 2). DCI format 1_0, 1_1, or 1_2 may be used as DCI indicating activation or deactivation of the SPS, and DCI format 0_0, 0_1, or 0_2 may be used as DCI indicating activation or deactivation of ConfiguredGrant (type2). More specifically, the CRC may be scrambled using a CS-RNTI (which may be configured for the terminal via RRC signaling), a value of a new data indicator (NDI) field in the DCI may be configured to be 0, a DFI flag field may be configured to be 0 if the DFI flag field exists, and for activation, if a PDSCH-to-HARQ-_feedback timing indicator field exists, and a value of the field satisfies a condition of not providing an inapplicable value among values of dl-DataToUL-ACK, the DCI may be interpreted as activation or inactivation. In a case where there is one SPS or ConfiguredGrant (type2) configuration, if all HARQ process number fields of the DCI are configured to be 0, and all redundancy version fields are configured to be 0, this may indicate that activation of the SPS or ConfiguredGrant (type2) is indicated. Alternatively, if all HARQ process number fields of the DCI are configured to be 0, all redundancy version fields are configured to be 0, all modulation and coding scheme fields are configured to be 1, all FDRA fields are configured to be 0 for FDRA type 0 or dynamicSwitch (i.e., if a resource allocation type can be changed based on the DCI), and all FDRA fields are configured to be 1 for FDRA type 1, this may indicate that deactivation of the SPS is indicated. Alternatively, if all HARQ process number fields of the DCI are configured to be 0, all redundancy version fields are configured to be 0, all modulation and coding scheme fields are configured to be 1, and all FDRA fields are configured to be 0 for FDRA type 2 (a u value is 1) and all FDRA fields are configured to be 1 for other cases, this may indicate that deactivation of ConfiguredGrant (type2) is indicated.

If there are multiple SPS or ConfiguredGrant (type2) configurations, the HARQ process number field in the DCI may indicate configuredGrantConfigIndex or sps-ConfigIndex within the SPS-config or ConfiguredGrant configuration, and if all redundancy version fields of the DCI are configured to be 0, this may indicate that activation of SPS or ConfiguredGrant (type2) corresponding to the sps-ConfigIndex or configuredGrantConfigIndex is indicated. Alternatively, if all redundancy version fields of the DCI are configured to be 0, all modulation and coding scheme fields are configured to be 1, all FDRA fields are configured to be 0 for FDRA type 0 or dynamicSwitch, and all FDRA fields are configured to be 1 for FDRA type 1, this may indicate that deactivation of the SPS corresponding to sps-ConfigIndex is indicated. Alternatively, if all redundancy version fields of the DCI are configured to be 0, all modulation and coding scheme fields are configured to be 1, and all FDRA fields are configured to be 0 for FDRA type 2 (a µ value is 1) and all FDRA fields are configured to be 1 for other cases, this may indicate that deactivation of ConfiguredGrant (type2) is indicated.

In case that the DCI indicating deactivation of the SPS is received, if configured downlink assignment of a corresponding serving cell exists, the terminal may clear the same, and if timeAlignmentTimer associated with TAG including a serving cell, to which HARQ feedback is to be transmitted, is running, an acknowledgment (ACK) for deactivation of the SPS may be transmitted.

In case that the DCI indicating deactivation of ConfiguredGrant is received, the terminal may trigger "configured uplink grant confirmation", transmit a MAC CE (e.g., configured grant confirmation MAC CE in case that one configured grant is configured, or multiple entry configured grant confirmation MAC CE in case that multiple entry configured grant confirmation MAC CEs are configured) confirming "configured uplink grant deactivation", and then clear configured uplink grant(s).

In case that the DCI indicating activation of the SPS is received, the terminal may store, as configured downlink assignment, downlink assignment of a corresponding serving cell and associated HARQ information, and may (re) initialize the configured downlink assignment of the serving cell.

In case that the DCI indicating activation of ConfiguredGrant is received, the terminal may trigger "configured uplink grant confirmation", transmit a MAC CE (e.g., configured grant confirmation MAC CE in case that one configured grant is configured, or multiple entry configured grant confirmation MAC CE in case that multiple configured grants are configured) confirming "configured uplink grant activation", store, as a configured uplink grant, an uplink grant of a corresponding serving cell and associated HARQ information, and (re-)initialize the configured uplink grant of the serving cell.

The base station may configure a value of an NDI field of the DCI to be 1, scramble the CRC of the DCI by a CS-RNTI, and transmit the DCI via a PDCCH, thereby scheduling retransmission for SPS PDSCH transmission or ConfiguredGrant PUSCH transmission.

The base station may transmit the PDSCH to the terminal in a resource determined according to the DCI indicating SPS activation and the SPS configuration configured for the terminal via RRC signaling. More specifically, for example, based on Equation 7, an Nth PDSCH transmission slot may be determined. The HARQ process ID associated with SPS transmission may be determined according to Equation 8 if harq-ProcID-Offset is not configured, and may be determined according to Equation 9 if harq-ProcID-Offset is configured. In the disclosure, a case where harq-ProcID-Offset is not configured or is configured may be determined depending on, for example, whether harq-ProcID-Offset is included or is not included in the SPS configuration as shown in Table 22.

$$(numberOfSlotsPerFrame \times SFN + \qquad \text{Equation 7}$$

$$\text{slot number in the frame}) =$$

$$[(numberOfSlotsPerFrame \times SFN_{start\ time} + slot_{start\ time}) +$$

$$N \times numberOfSlotsPerFrame/10]$$

$$\text{modulo } (1024 \times numberOfSlotsPerFrame)$$

In Equation 7, SFNstart time and slotstart time indicate a slot and an SFN of first PDSCH transmission in which the configured downlink assignment is (re-)initialized, and numberOfSlotsPerFrame indicates the number of slots included in a frame.

$$HARQ \text{ Process ID} = [floor \qquad \text{Equation 8}$$

$$(CURRENT\_slot \times 10/(numberOfSlotsPerFrame \times periodicity))]$$

$$\text{modulo } nrofHARQ{-}Processes$$

In Equation 8, CURRREN_slot may be determined by the following equation.

CURRENT_slot=[(SFN×numberOfSlotsPerFrame)+ slot number in the frame]

Here, CURRENT_slot indicates a slot index of a first transmission occurrence for a bundle of configured downlink assignment.

$$HARQ \text{ Process ID} = [floor(CURRENT\_slot \times \qquad \text{Equation 9}$$

$$10/(numberOfSlotsPerFrame \times periodicity))]$$

$$\text{modulo } nrofHARQ{-}Processes + harq{-}ProcID{-}Offset$$

In Equation 9, CURRREN_slot may be determined by the following equation.

CURRENT_slot=[(SFN×numberOfSlotsPerFrame)+ slot number in the frame]

Here, CURRENT_slot indicates a slot index of a first transmission occurrence for a configured downlink assignment bundle.

For uplink transmission, the terminal may transmit a PUSCH in a resource (ConfiguredGrant type1) determined according to information configured via RRC signaling. More specifically, for example, a position of an Nth uplink grant may be determined according to Equation 10.

$$[(SFN \times numberOfSlotsPerFrame \times \qquad \text{Equation 10}$$

$$numberOfSymbolsPerSlot) + (\text{slot number in the frame} \times$$

$$numberOfSymbolsPerSlot) + \text{symbol number in the slot}] =$$

$$(timeReferenceSFN \times numberOfSlotsPerFrame \times$$

$$numberOfSymbolsPerSlot + timeDomainOffset \times$$

$$numberOfSymbolsPerSlot + S + N \times periodicity) \text{ modulo}$$

$$(1024 \times numberOfSlotsPerFrame \times numberOfSymbolsPerSlot)$$

The terminal may transmit a PUSCH in a resource (ConfiguredGrant type 2) determined according to configuration information on a configured grant received via RRC signaling and DCI indicating activation of the configured grant. More specifically, for example, a position of an Nth uplink grant may be determined according to Equation 11.

$$[(SFN \times numberOfSlotsPerFrame \times \qquad \text{Equation 11}$$

$$numberOfSymbolsPerSlot) + (\text{slot number in the frame} \times$$

$$numberOfSymbolsPerSlot) +$$

$$\text{symbol number in the slot}] = [(SFN_{start\ time} \times$$

$$numberOfSlotsPerFrame \times numberOfSymbolsPerSlot +$$

$$slot_{start\ time} \times numberOfSymbolsPerSlot + symbol_{start\ time}) +$$

$$N \times periodicity) \text{ modulo}(1024 \times$$

$$numberOfSlotsPerFrame \times numberOfSymbolsPerSlot)$$

In Equation 11, SFNstart time, slotstart time, and symbolstart time indicate an SFN, a slot, and a symbol for first PUSCH transmission in which a configured uplink grant is (re-)initialized, and numberOfSlotsPerFrame indicates the number of slots included in a frame.

An HARQ process ID associated with a first symbol of uplink transmission according to a configured grant may be determined based on Equation 12 if harq-ProcID-Offset2 and cg-RetransmissionTimer are not configured, and may be determined based on Equation 13 if harq-ProcID-Offset2 is configured. If cg-RetransmissionTimer is configured, the terminal may select one of available HARQ process IDs in the ConfiguredGrant configuration. The terminal may prioritize retransmission over initial transmission. Whether harq-ProcID-Offset2 or cg-RetransmissionTimer is configured or is not configured may be determined according to, for example, as in Table 23, whether the ConfiguredGrant configuration includes harq-ProcID-Offset2 or cg-RetransmissionTimer.

$$HARQ \text{ Process ID} = [floor(CURRENT\_symbol/periodicity)] \quad \text{Equation 12}$$

$$\text{modulo } nrofHarQ{-}Processses{-}CURRENT\_symbol =$$

$$(SFN \times numberOfSlotsPerFrame \times numberOfSymbolsPerSlot +$$

$$\text{slot number in the frame} \times numberOfSymbolsPerSlot +$$

$$\text{symbol number in the frame})$$

In Equation 12, numberOfSlotsPerFrame indicates the number of slots included in a frame, and numberOfSymbolsPerSlot indicates the number of symbols included in a slot.

Here, CURRENT_symbol indicates a symbol index of a first transmission occurrence for a configured uplink grant bundle.

$$HARQ \text{ Process ID} = [floor(CURRENT\_symbol/periodicity)] \quad \text{Equation 13}$$

$$\text{modulo } nrofHarQ{-}Processses$$

$$+harq{-}ProcID{-}Offset2{-}CURRENT\_symbol =$$

$$(SFN \times numberOfSlotsPerFrame \times numberOfSymbolsPerSlot +$$

-continued $$\text{slot number in the frame} \times numberOfSymbolsPerSlot +$$

$$\text{symbol number in the slot})$$

In Equation 13, numberOfSlotsPerFrame indicates the number of slots included in a frame, and numberOfS-ymbolsPerSlot indicates the number of symbols included in a slot.

CURRENT_symbol indicates a symbol index of a first transmission occurrence for a configured uplink grant bundle.

In the communication system to which the disclosure is applicable, a method of transmitting one TB over multiple slots may be considered for uplink transmission in order to improve coverage of an uplink channel. Hereinafter, this will be described in detail with reference to FIG. 11.

FIG. 11 is a diagram illustrating an example of a method in which one TB is transmitted over multiple slots (TB processing over multi-slot (TBoMS)) in the communication system according to an embodiment of the disclosure.

Referring to FIG. 11, one TB 1101 may be allocated to and transmitted over multiple slots 1102, 1103, 1104, and 1105. In this case, by allocating one TB to resources of the multiple slots 1102, 1103, 1104, and 1105, a low code rate may be applied to obtain a channel coding gain, and cov-erage of an uplink channel may be improved. Referring to FIG. 11, in case that a PUSCH for TBoMS is transmitted, a method 1106 of allocating a time domain resource as in PUSCH repetition type A and a method 1107 of allocating a time domain resource as in PUSCH repetition type B may be applied as time domain resource allocation methods. In case that a time domain resource is allocated to the PUSCH for TBoMS as in PUSCH repetition type A, the PUSCH may be transmitted in multiple slots having the same symbol resource per each slot. In case that a time domain resource is allocated to the PUSCH for TBoMS as in PUSCH repetition type B, the resource may be allocated as in Case 0 1108, Case 1 1109, and Case 2 1110 according to symbol length L configured via higher-layer signaling and L1 sig-naling (e.g., DCI).

Although uplink transmission has been taken as an example in FIG. 11, a method of transmitting one TB over multiple slots (TB processing over multi-slot (TBoMS)) in the communication system according to an embodiment of the disclosure may also be applied to downlink transmission similarly to FIG. 11 and the description above. More specific descriptions will be provided with reference to FIG. 12.

Figure 12:
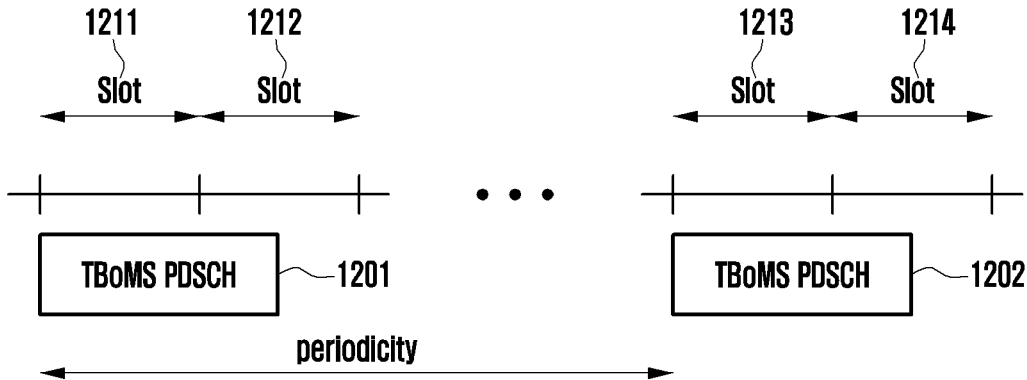
FIG. 12 is a diagram illustrating an example in which a base station configures SPS and TBoMS for a terminal, and PDSCH transmission is performed accordingly in the communication system according to an embodiment of the disclosure.

FIG. 12 is a diagram illustrating an example in which a base station configures SPS and TBoMS for a terminal, and PDSCH transmission is performed accordingly in the com-munication system according to an embodiment of the disclosure.

As described above, the base station may configure, for the terminal, configuration information as in Table 22 via higher-layer signaling (e.g., RRC signaling) and may indi-cate (or configure), to the terminal, that one TB is transmit-ted over multiple slots (i.e., a corresponding PDSCH is for TBoMS) according to higher-layer signaling, L1 signaling (e.g., DCI), or a combination thereof. The base station may transmit an SPS PDSCH 1201 or 1202 to the terminal over multiple slots 1211, 1212 or 1213, and 1214 according to the configuration as above, and the terminal may receive down-link data on the SPS PDSCH 1201 or 1202. Accordingly, since one TB is transmitted over multiple slots, a low code rate may be applied, so that channel coding gain may be obtained, and coverage of a downlink channel may be improved.

The configuration (or indication) for processing the TB transmitted via multiple slots (TB processing over multi-slot (TBoMS)) is performed in case that the terminal supports TBoMS. According to an embodiment of the disclosure, UE capability information for TBoMS may be defined. In case that a "UECapabilityEnquiry" message is received from the base station, the terminal may transmit a response message including the "UE capability information for TBoMS" to the base station. The base station may determine configuration information, scheduling, etc. for the terminal, based on the "UE capability information for TBoMS" included in the response message. The configuration information may include information configured via RRC signaling.

According to an embodiment of the disclosure, for a terminal supporting TBoMS, a base station may configure parameters related to TBoMS via RRC signaling. The parameters transmitted via RRC signaling may include PUSCH-TimeDomainResourceAllocationList, PDSCH-TimeDomainResourceAllocationList, etc. which are param-eters related to time axis resource allocation. Information included in at least one entry of PUSCH-TimeDomainRe-sourceAllocationList and PDSCH-TimeDomainRe-sourceAllocationList configured for the terminal supporting TBoMS may include a parameter indicating that time axis resource allocation indicated by a corresponding entry is for TBoMS. The base station may select one entry included in PUSCH-TimeDomainResourceAllocationList and PDSCH-TimeDomainResourceAllocationList, configure a value cor-responding to an index of the selected entry in a time domain resource assignment (TDRA) field in a DCI format (e.g., 0-0/0-1/0-2 for uplink scheduling or 1-0/1-1/1-2 for down-link scheduling), and transmit the DCI to the terminal via a PDCCH, thereby indicating that a PDSCH or PUSCH scheduled by the DCI is for TBoMS. For example, in case that transmitting DCI to activate at least one SPS among multiple SPSs configured for the terminal, the base station may configure a TDRA in the DCI to be a value correspond-ing to an index of an entry indicating time axis resource allocation for TBoMS. In this case, an SPS PDSCH sched-uled according to the activated SPS may be transmitted to the terminal over multiple slots.

As described above, an HARQ process ID associated with SPS PDSCH transmission may be determined according to Equation 8 if harq-ProcID-Offset is not configured, and may be determined according to Equation 9 if harq-ProcID-Offset is configured. In Equations 8 and 9, CURRENT_slot indicates a slot index of a first transmission occurrence (which may be referred to by terms having the same or similar meanings, such as a PDSCH transmission time point, a PDSCH transmission occurrence, a PDSCH reception time point, and a PDSCH reception occurrence) for a configured downlink assignment bundle. In this case, as illustrated in FIG. 12, if there are multiple slots, such as the slots 1211 and 1212, included in the first transmission occurrence accord-ing to the TBoMS configuration, a problem that the HARQ process ID is determined differently may occur depending on which slot is selected as a reference slot (CURRENT-_slot) used to determine the HARQ process ID. That is, since the base station and the terminal determine the HARQ process ID based on different criteria (CURRENT_slot), there may occur a problem that an HARQ operation for transmission or reception of the SPS PDSCH is not properly performed. In this respect, if SPS and TBoMS are configured at the same time, in order to support smooth communication between the terminal and the base station, a method in which the terminal and the base station determines an HARQ process ID by using the same criterion or method needs to be devised. According to an embodiment of the disclosure, a reference slot (e.g., CURRENT_slot) used for determining an HARQ process ID may be selected as the first slot among multiple slots included in a first transmission occurrence according to a corresponding SPS configuration. For example, in the case of FIG. 12, the terminal and the base station may determine CURRENT_slot by using an index of the first slot 1211 among the slots 1211 and 1212 included in the first transmission occurrence 1201. If harq-ProcID-Offset is not configured for a corresponding SPS, the HARQ process ID may be determined by substituting the determined CURRENT_slot into Equation 8, and if harq-ProcID-Offset is configured for the SPS, the HARQ process ID may be determined by substituting the determined CURRENT_slot into Equation 9.

According to an embodiment of the disclosure, the reference slot used to determine the HARQ process ID may be selected as the last slot among the slots included in the first transmission occurrence according to the SPS configuration. For example, in the case of FIG. 12, the terminal and the base station may determine CURRENT_slot by using an index of the last slot 1212 among the slots 1211 and 1212 included in the first transmission occurrence 1201. If harq-ProcID-Offset is not configured for the SPS, the HARQ process ID may be determined by substituting the determined CURRENT_slot into Equation 8, and if harq-ProcID-Offset is configured for the SPS, the HARQ process ID may be determined by substituting the determined CURRENT_slot into Equation 9.

In addition, according to an embodiment of the disclosure, the base station may indicate the reference slot used to determine the HARQ process ID to the terminal via RRC signaling, MAC CE signaling, L1 signaling (e.g., DCI), or a combination of at least two of the signalings. For example, in the case of FIG. 12, in case that one of the slots 1211 and 1212 included in the first transmission occurrence 1201 is indicated via the indication, the terminal and the base station may determine CURRENT_slot by using an index of the indicated slot. If harq-ProcID-Offset is not configured for the SPS, the HARQ process ID may be determined by substituting the determined CURRENT_slot into Equation 8, and if harq-ProcID-Offset is configured for the SPS, the HARQ process ID may be determined by substituting the determined CURRENT_slot into Equation 9. According to an embodiment of the disclosure, indication of the reference slot used to determine the HARQ process ID may be performed via at least one bit included in at least one bit field included in an SPS activation signal (e.g., the DCI described above) transmitted through a PDCCH in at least one search space. In addition, according to an embodiment of the disclosure, the indication may be performed via at least one bit included in at least one bit field included in an SPS activation signal which has a MAC CE format and is transmitted through a PDSCH.

In addition, according to an embodiment of the disclosure, the HARQ process ID may be determined based on the first symbol of the first transmission occurrence for a configured downlink assignment bundle according to the SPS configuration. For example, in the case of FIG. 12, the terminal and the base station may identify the first symbol of the first transmission occurrence 1201 and determine the reference symbol (CURRENT_symbol) used to determine the HARQ process ID by using an index of the first symbol. The terminal and the base station may determine the HARQ process ID by substituting the determined CURRENT_symbol into Equations 12 and 13 for determining the HARQ process ID associated with a configured grant for uplink transmission. If harq-ProcID-Offset is not configured for the SPS, the HARQ process ID may be determined by substituting the determined CURRENT_symbol into Equation 12, and if harq-ProcID-Offset is configured for the SPS, the HARQ process ID may be determined by substituting the determined CURRENT_symbol into Equation 13. In this case, nrofHARQ-Process (number of HARQ processes) and harq-ProcID-Offset in Equations 12 and 13 may be replaced with nrofHARQ-Process (number of HARQ processes) and harq-ProcID-Offset configured for the SPS. The aforementioned embodiment may also be applied to determining the HARQ process ID for downlink transmission regardless of whether TBoMS has been configured (that is, regardless of whether the first transmission occurrence includes multiple slots).

According to an embodiment of the disclosure, some of the above embodiments have been described as being applicable to a case (i.e., PDSCH transmission according to the TBoMS configuration) where multiple slots are included in the first transmission occurrence, but may also be applicable to a channel (e.g., PUSCH, PSSCH, etc.) other than a PDSCH. Although some of the above embodiments have mainly been described for the case where there are two slots corresponding to the first transmission occurrence, the disclosure is not limited thereto, and it is natural for a person skilled in the art that the embodiments described in the disclosure is applicable even to a case of three or more slots.

Hereinafter, descriptions will be provided for operations of a terminal and a base station for determining an HARQ process ID according to the described embodiments in case that the base station configures SPS and TBoMS for the terminal.

Figure 13:
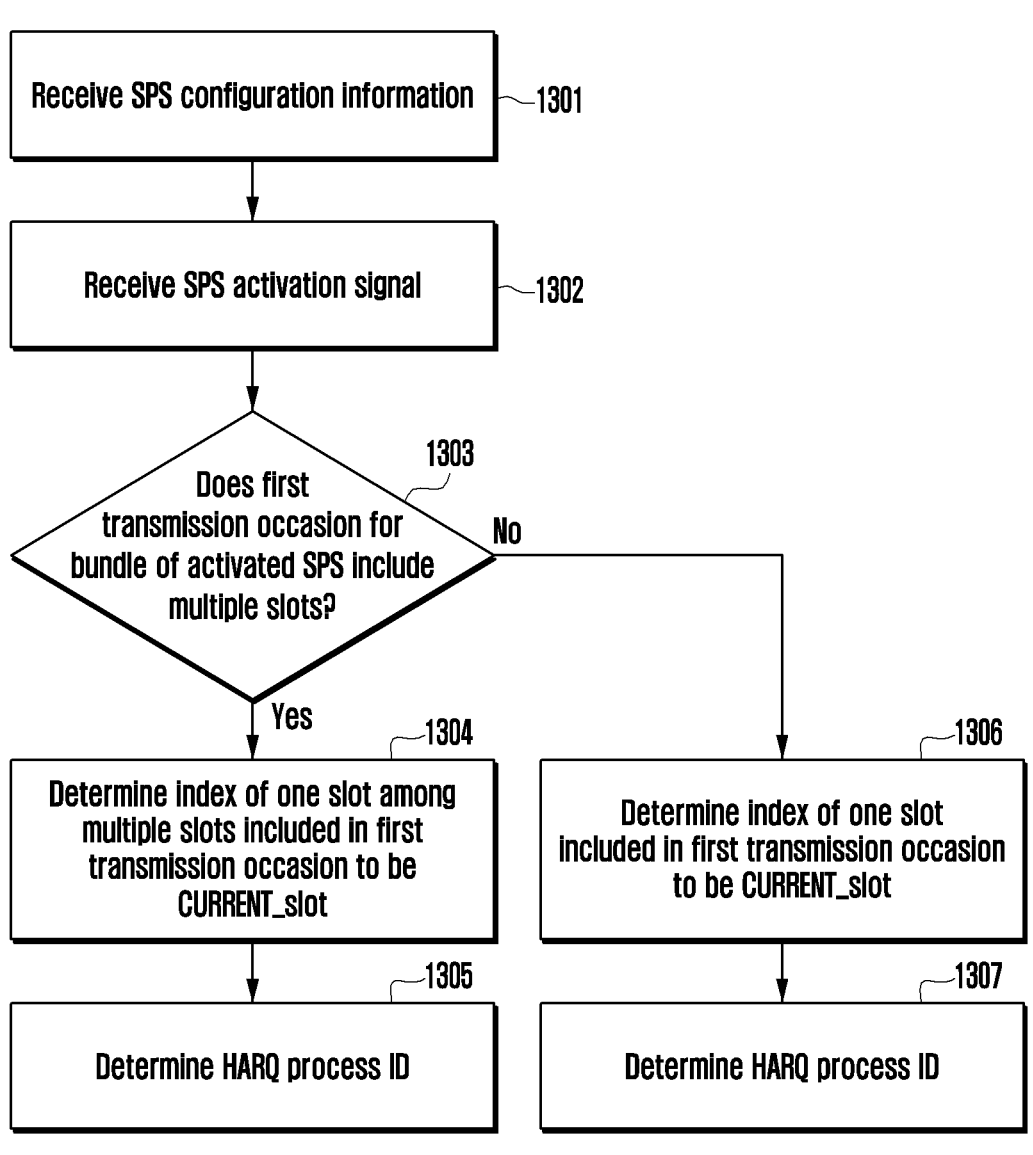
FIG. 13 is a diagram illustrating an operation of a terminal according to an embodiment of the disclosure.

FIG. 13 is a diagram illustrating an operation of a terminal according to an embodiment of the disclosure.

Referring to FIG. 13, a terminal may receive configuration information for SPS from a base station in 1301. The configuration information may include, for example, information as in Table 22. The terminal may receive an SPS activation signal transmitted through a PDCCH or an SPS activation signal which has a MAC CE format and is transmitted through a PDSCH, in operation 1302. Here, the SPS activation signal transmitted through the PDCCH may include DCI. Specifically, the terminal may monitor the SPS activation signal transmitted through the PDCCH in at least one search space according to the aforementioned embodiments, or may monitor the SPS activation signal which has the MAC CE format and is transmitted through the PDSCH. A procedure of monitoring the SPS activation signal transmitted through the PDCCH may be a procedure including determining whether SPS activation conditions according to the aforementioned embodiments are satisfied. A CRC of DCI transmitted on the monitored PDCCH may be scrambled using a CS-RNTI. As a result of the monitoring, if the SPS activation signal is detected, the terminal may identify a value of an HARQ process number field (HPN field) included in the DCI transmitted through the PDCCH, and may identify, by determining sps-ConfigIndex corresponding to the value, that activation of the SPS corresponding to ConfigIndex has been indicated. The terminal may determine whether a first transmission occurrence for a bundle of the activated SPS includes multiple slots, in operation 1303. That is, the terminal may determine whether a transmission resource for the activated SPS is for transmission according to TBoMS, based on an entry in a time domain resource allocation list (e.g., PDSCH-TimeDomain-ResourceAllocationList) indicated by a TDRA field included in the SPS activation signal. Specific details on this have been described above, and will be thus omitted here. If the first transmission occurrence includes multiple slots, the terminal may determine CURRENT_slot, which is a reference slot used to determine an HARQ process ID, based on an index of any one of the multiple slots, in operation 1304. Specific details on a method for determining CURRENT_slot have been described above, and will be thus omitted here. If harq-ProcID-Offset is not configured for the SPS, the terminal may determine an HARQ process ID by substituting the determined CURRENT_slot into Equation 8, in operation 1305. Alternatively, if harq-ProcID-Offset is configured for the SPS, the terminal may determine the HARQ process ID by substituting the determined CURRENT_slot into Equation 9, in operation 1305. If the first transmission occurrence includes one slot, the terminal may determine CURRENT_slot based on an index of the one slot, in operation 1306. If harq-ProcID-Offset is not configured for the SPS, the terminal may determine the HARQ process ID by substituting the determined CURRENT_slot into Equation 8, in operation 1307. Alternatively, if harq-ProcID-Offset is configured for the SPS, the terminal may determine the HARQ process ID by substituting the determined CURRENT_slot into Equation 9, in operation 1307. In operation 1304, if the first transmission occurrence includes multiple slots, the terminal may determine a first symbol of the first transmission occurrence to be CURRENT_symbol which is a reference symbol used to determine the HARQ process ID. In this case, the terminal may determine the HARQ process ID by substituting the determined CURRENT_symbol into Equations 12 and 13 for determining of the HARQ process ID associated with a configured grant for uplink transmission, in operation 1305. Alternatively, in operation 1306, if the first transmission occurrence includes one slot, the terminal may determine the first symbol of the first transmission occurrence to be CURRENT_symbol which is the reference symbol used to determine the HARQ process ID. In this case, the terminal may determine the HARQ process ID by substituting the determined CURRENT_symbol into Equations 12 and 13 for determining of the HARQ process ID associated with the configured grant for uplink transmission, in operation 1307. If harq-ProcID-Offset is not configured for the SPS, the HARQ process ID may be determined by substituting the determined CURRENT_symbol into Equation 12, and if harq-ProcID-Offset is configured for the SPS, the HARQ process ID may be determined by substituting the determined CURRENT_symbol into Equation 13. In this case, nrofHARQ-Process (number of HARQ processes) and harq-ProcID-Offset in Equations 12 and 13 may be replaced with nrofHARQ-Process (number of HARQ processes) and harq-ProcID-Offset configured for the SPS.

In FIG. 13 of the disclosure, operations 1301 to 1307 are illustrated to be performed in sequence, but may be performed concurrently or may be partially omitted.

FIG. 14 is a diagram illustrating an operation of a base station according to an embodiment of the disclosure.

Referring to FIG. 14, a base station may transmit configuration information on SPS to a terminal in operation 1401. The configuration information may include, for example, information as in Table 22. The base station may determine sps-ConfigIndex corresponding to SPS to be activated from among at least one configured SPS, configure (set) a value of an HARQ process number field (HPN field) in an SPS activation signal to be a vale corresponding to the ConfigIndex, determine the number of slots included in a first transmission occurrence according to the SPS so as to configure, to be a value of a TDRA field in the SPS activation signal, a value corresponding to an entry indicating time axis resource allocation where the first transmission occurrence in a time axis resource allocation list (e.g., PDSCH-TimeDomainResourceAllocationList) includes the determined number of slots, and transmit the SPS activation signal in operation 1402. The SPS activation signal may be a MAC CE transmitted through a PDSCH, and values of at least some fields of the MAC CE may be determined to be values corresponding to sps-ConfigIndex corresponding to configuration of the SPS to be activated. The base station may determine whether a first transmission occurrence for a bundle of the activated SPS includes multiple slots, in operation 1403. If the first transmission occurrence includes multiple slots, the base station may determine CURRENT_slot, which is a reference slot used to determine an HARQ process ID, based on an index of any one of the multiple slots, in operation 1404. Specific details on a method for determining CURRENT_slot have been described above, and will be thus omitted here. If harq-ProcID-Offset is not configured for the SPS, the base station may determine the HARQ process ID by substituting the determined CURRENT_slot into Equation 8, in operation 1405. Alternatively, if harq-ProcID-Offset is configured for the SPS, the base station may determine the HARQ process ID by substituting the determined CURRENT_slot into Equation 9, in operation 1405. If the first transmission occurrence includes one slot, the base station may determine CURRENT_slot based on an index of the one slot, in operation 1406. If harq-ProcID-Offset is not configured for the SPS, the base station may determine the HARQ process ID by substituting the determined CURRENT_slot into Equation 8, in operation 1407. Alternatively, if harq-ProcID-Offset is configured for the SPS, the base station may determine the HARQ process ID by substituting the determined CURRENT_slot into Equation 9, in operation 1407. In operation 1404, if the first transmission occurrence includes multiple slots, the base station may determine a first symbol of the first transmission occurrence to be CURRENT_symbol which is a reference symbol used to determine the HARQ process ID. In this case, the base station may determine the HARQ process ID by substituting the determined CURRENT_symbol into Equations 12 and 13 for determining of the HARQ process ID associated with the configured grant for uplink transmission, in operation 1405. Alternatively, in operation 1406, if the first transmission occurrence includes one slot, the base station may determine the first symbol of the first transmission occurrence to be CURRENT_symbol which is the reference symbol used to determine the HARQ process ID. In this case, the base station may determine the HARQ process ID by substituting the determined CURRENT_symbol into Equations 12 and 13 for determining of the HARQ process ID associated with the configured grant for uplink transmission, in operation 1407. If harq-ProcID-Offset is not configured for the SPS, the HARQ process ID may be determined by substituting the determined CURRENT_symbol into Equation 12, and if harq-ProcID-Offset is configured for the SPS, the HARQ process ID may be determined by substituting the determined CURRENT_symbol into Equation 13. In this case, nrofHARQ-Process (number of HARQ processes) and harq-ProcID-Offset in Equations 12 and 13 may be replaced with nrofHARQ-Process (number of HARQ processes) and harq-ProcID-Offset configured for the SPS.

In FIG. 14 of the disclosure, operations 1401 to 1407 are illustrated to be performed in sequence, but may be performed concurrently or may be partially omitted.

According to the description above, even in case that the base station configures SPS and TBoMS for the terminal, the terminal and the base station may determine an HARQ process ID by using the same criteria and method, so that a more accurate HARQ operation may be performed in the terminal and the base station.

Figure 15:
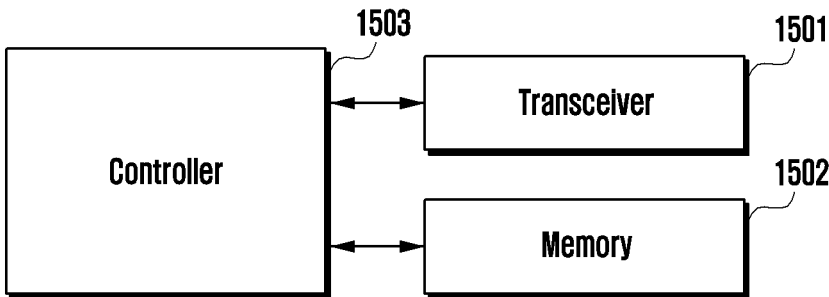
FIG. 15 is a diagram illustrating a structure of a terminal according to an embodiment of the disclosure.

FIG. 15 is a diagram illustrating a structure of a terminal according to an embodiment of the disclosure.

Referring to FIG. 15, a terminal may include a transceiver 1501, a controller 1503, and a memory 1502. In the disclosure, the controller may be defined as a circuit, an application-specific integrated circuit, or at least one processor.

The transceiver 1501 may transmit a signal to or receive a signal from another network entity. The transceiver 1501 may receive, for example, SPS configuration information to from a base station, and the configuration information may be received via RRC signaling, an MIB, or an SIB. In addition, the configuration information may include information on a BWP, and may include information on mcs-Table. The transceiver 1501 may receive a group-common PDCCH or DCI through the group-common PDCCH, receive DCI through a UE-specific PDCCH, or receive a MAC CE. The DCI or MAC CE may be a signal for activation of SPS. In addition, if the transceiver 1501 fails to receive the SPS activation signal, the transceiver 1501 may receive a retransmitted SPS activation signal. The transceiver 1501 may receive configuration (indication) information including slot indication-related information (information on a slot based on which CURRENT_slot is to be determined) via RRC signaling, an MAC CE, or DCI. The transceiver 1501 may receive data from a base station. The transceiver 1501 may receive new transmission data or retransmission data from a base station through an SPS PDSCH. In addition, the transceiver 1501 may perform signal transmission or reception of the terminal in the disclosure described above.

The controller 1503 may control overall operations of the terminal according to an embodiment proposed in the disclosure. For example, the controller 1503 may control signal flows between respective blocks to perform operations according to the aforementioned flowchart. For example, the controller 1503 may receive an SPS activation signal to determine whether the SPS is activated. In addition, the controller 1503 may identify a configuration of the activated SPS, based on the SPS activation signal. In addition, the controller 1503 may identify a TBoMS configuration, based on the SPS activation signal. In addition, the controller 1503 may receive a PDSCH from a base station, based on the SPS configuration. In addition, the controller 1503 may determine whether a first transmission occurrence for a bundle of the activated SPS includes multiple slots, based on the TBoMS configuration, the SPS configuration, etc. If the first transmission occurrence includes multiple slots, CURRENT_slot may be determined based on an index of any one of the multiple slots. In this case, the controller 1503 may follow a predefined rule, such as determining a first slot or a last slot among multiple slots included in the first transmission occurrence to be CURRENT_slot, or may determine CURRENT_slot based on an index of a slot indicated according to slot indication-related information (information on a slot based on which CURRENT_slot is to be determined) received from the base station. The controller 1503 may determine an HARQ process ID by substituting the determined CURRENT_slot into Equation 8 or Equation 9.

Alternatively, the controller 1503 may determine an index of a first symbol of the first transmission occurrence to be CURRENT_symbol used to determine an HARQ process ID. In this case, the controller 1503 may determine the HARQ process ID by substituting the determined CURRENT_symbol into Equation 12 or Equation 13.

In addition, the operation of the terminal described above may be controlled by the controller 1503.

The memory 1502 may store at least one of information transmitted or received via the transceiver 1501 and information generated via the controller 1503.

Figure 16:
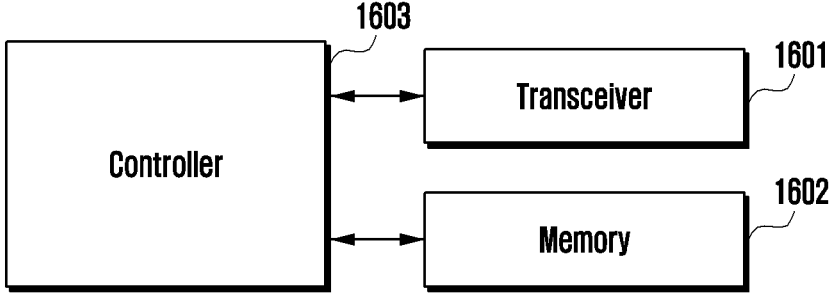
FIG. 16 is a diagram illustrating a structure of a base station according to an embodiment of the disclosure.

FIG. 16 is a diagram illustrating a structure of a base station according to an embodiment of the disclosure.

Referring to FIG. 16, a base station may include a transceiver 1601, a controller 1603, and a memory 1602. In the disclosure, the controller may be defined as a circuit, an application-specific integrated circuit, or at least one processor.

The transceiver 1601 may transmit a signal to or receive a signal from another network entity. The transceiver 1601 may transmit, for example, SPS configuration information to a terminal, and the configuration information may be transmitted via RRC signaling, an MIB, or an SIB. In addition, the configuration information may include information on a BWP, and may include information on mcs-Table. The transceiver 1601 may transmit a group-common PDCCH or DCI through the group-common PDCCH, transmit DCI through a UE-specific PDCCH, or transmit a MAC CE. The DCI or MAC CE may be a signal for activation of SPS. In addition, the transceiver 1601 may retransmit the SPS activation signal. The transceiver 1601 may transmit configuration (indication) information including slot indication-related information (information on a slot based on which CURRENT_slot is to be determined) via RRC signaling, an MAC CE, or DCI. The transceiver 1601 may transmit data to a terminal. The transceiver 1601 may transmit new transmission data or retransmission data to a terminal through an SPS PDSCH. In addition, the transceiver 1601 may perform signal transmission or reception of the base station in the disclosure described above.

The controller 1603 may control overall operations of the base station according to an embodiment proposed in the disclosure. For example, the controller 1603 may control signal flows between respective blocks to perform operations according to the aforementioned flowchart. For example, the controller 1603 may transmit an SPS activation signal to activate an SPS configuration. In addition, the controller 1603 may configure a TDRA field in the SPS activation signal to be a value indicating time axis resource allocation for TBoMS, and may configure TBoMS by transmitting the SPS activation signal. In addition, the controller 1603 may transmit a PDSCH to a terminal, based on the SPS configuration. In addition, the controller 1603 may determine whether a first transmission occurrence for a bundle of the activated SPS includes multiple slots, based on the TBoMS configuration, the SPS configuration, etc. If the first transmission occurrence includes multiple slots, the controller 1603 may determine CURRENT_slot based on an index of any one of the multiple slots. In this case, the controller 1603 may follow a predefined rule, such as determining a first slot or a last slot among multiple slots included in the first transmission occurrence to be CURRENT_slot, or in case that a specific slot is determined from among the multiple slots and is transmitted as slot indication-related information (information on a slot based on which CURRENT_slot is to be determined) to the terminal, the controller 1603 may determine CURRENT_slot based on an index of a slot indicated according to the slot indication-related information. The controller 1602 may determine an HARQ process ID by substituting the determined CURRENT_slot into Equation 8 or Equation 9. Alternatively, the controller 1603 may determine an index of a first symbol of the first transmission occurrence to be CURRENT_symbol used to determine an HARQ process ID. In this case, the controller 1603 may determine the HARQ process ID by substituting the determined CURRENT_symbol into Equation 12 or Equation 13. The controller 1602 may receive and process HARQ-ACK information fed back by the terminal according to the determined HARQ process ID. The controller 1603 may retransmit the SPS activation signal in case that it is determined that the terminal has failed to receive the SPS activation signal. In addition, the operation of the base station described above may be controlled by the controller 1603.

The memory 1602 may store at least one of information transmitted or received via the transceiver 1601 and information generated via the controller 1603.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in the methods of the disclosure, some or all of the contents of each embodiment may be combined without departing from the essential spirit and scope of the disclosure.

The invention claimed is:

1. A method of operating a terminal in a communication system, the method
comprising:
receiving configuration information associated with at least one semi-persistent scheduling (SPS) from a base station;
receiving, from the base station, an SPS activation signal indicating activation of a first SPS among the at least one SPS;
identifying whether a first physical downlink shared channel (PDSCH) reception occurrence among at least one PDSCH reception occurrence associated with the first SPS comprises multiple slots based on configuration information associated with the first SPS and the SPS activation signal;
determining one slot among the multiple slots as a reference slot, in a case that the first PDSCH reception occurrence comprises the multiple slots; and
determining a hybrid automatic repeat request (HARQ) process identifier (ID) for a HARQ process for the first PDSCH reception occurrence, based on information on the determined reference slot.

2. The method of claim 1, wherein the reference slot is determined to be:
a first slot among the multiple slots;
a last slot among the multiple slots; or
a slot indicated by the SPS activation signal from among the multiple slots.

3. The method of claim 1,
wherein the HARQ process ID is determined based on information on a first symbol of the first PDSCH reception occurrence, wherein user equipment (UE) capability information indicating that the terminal supports processing of a transport block (TB) transmitted over the multiple slots is transmitted to the base station,
wherein a PDSCH time axis allocation list including information on at least one PDSCH time axis allocation is configured for the terminal via radio resource control (RRC) signaling,
wherein a time domain resource allocation (TDRA) field value is included in the SPS activation signal and indicates one PDSCH time axis allocation of the at least one PDSCH time axis allocation, and
wherein whether the first PDSCH reception occurrence comprises the multiple slots is identified based on the indicated PDSCH time axis allocation.

4. A method of operating a base station in a communication system,
the method
comprising:
transmitting configuration information associated with at least one semi-persistent scheduling (SPS) to a terminal;
transmitting, to the terminal, an SPS activation signal indicating activation of a first SPS among the at least one SPS;
identifying whether a first physical downlink shared channel (PDSCH) reception occurrence among at least one PDSCH reception occurrence associated with the first SPS comprises multiple slots, based on configuration information associated with the first SPS and the SPS activation signal;
determining one slot among the multiple slots as a reference slot, in a case that the first PDSCH reception occurrence comprises the multiple slots; and
determining a hybrid automatic repeat request (HARQ) process identifier (ID) for a HARQ process for the first PDSCH reception occurrence, based on information on the determined reference slot.

5. The method of claim 4, wherein the reference slot is determined to be:
a first slot among the multiple slots;
a last slot among the multiple slots; or
a slot indicated by the SPS activation signal from among the multiple slots.

6. The method of claim 4,
wherein the HARQ process ID is determined based on information on a first symbol of the first PDSCH reception occurrence,
wherein user equipment (UE) capability information indicating that the terminal supports processing of a transport block (TB) transmitted over the multiple slots is received from the terminal,
wherein a PDSCH time axis allocation list including information on at least one PDSCH time axis allocation is configured for the terminal via radio resource control (RRC) signaling,
wherein a time domain resource allocation (TDRA) field value is included in the SPS activation signal and indicates one PDSCH time axis allocation of the at least one PDSCH time axis allocation, and
wherein whether the first PDSCH reception occurrence comprises the multiple slots is identified based on the indicated PDSCH time axis allocation.

7. A terminal of a communication system, the terminal comprising:
a transceiver; and
a controller connected to the transceiver, wherein the controller is configured to:

receive configuration information associated with at least one semi-persistent scheduling (SPS) from a base station, receive, from the base station, an SPS activation signal indicating activation of a first SPS among the at least one SPS, identify whether a first physical downlink shared channel (PDSCH) reception occurrence among at least one PDSCH reception occurrence associated with the first SPS comprises multiple slots, based on configuration information associated with the first SPS and the SPS activation signal, determine one slot among the multiple slots as a reference slot, in case that the first PDSCH reception occurrence comprises the multiple slots, and determine a hybrid automatic repeat request (HARQ) process identifier (ID) for a HARQ process for the first PDSCH reception occurrence, based on information on the determined reference slot.

8. The terminal of claim 7, wherein the reference slot is determined to be:

a first slot among the multiple slots;

a last slot among the multiple slots; or a slot indicated by the SPS activation signal from among the multiple slots.

9. The terminal of claim 7, wherein the HARQ process ID is determined based on information on a first symbol of the first PDSCH reception occurrence, wherein user equipment (UE) capability information indicating that the terminal supports processing of a transport block (TB) transmitted over the multiple slots is transmitted to the base station, wherein a PDSCH time axis allocation list including information on at least one PDSCH time axis allocation is configured for the terminal via radio resource control (RRC) signaling, wherein a time domain resource allocation (TDRA) field value is included in the SPS activation signal and indicates one PDSCH time axis allocation of the at least one PDSCH time axis allocation, and wherein whether the first PDSCH reception occurrence comprises the multiple slots is identified based on the indicated PDSCH time axis allocation.

10. A base station of a communication system, the base station comprising:

a transceiver; and a controller connected to the transceiver, wherein the controller is configured to:

transmit configuration information associated with at least one semi-persistent scheduling (SPS) to a terminal, transmit, to the terminal, an SPS activation signal indicating activation of a first SPS among the at least one SPS, identify whether a first physical downlink shared channel (PDSCH) reception occurrence among at least one PDSCH reception occurrence associated with the first SPS comprises multiple slots, based on configuration information associated with the first SPS and the SPS activation signal, determine one slot among the multiple slots as a reference slot, in case that the first PDSCH reception occurrence comprises the multiple slots, and determine a hybrid automatic repeat request (HARQ) process identifier (ID) for a HARQ process for the first PDSCH reception occurrence, based on information on the determined reference slot.

11. The base station of claim 10, wherein the reference slot is determined to be:

a first slot among the multiple slots;

a last slot among the multiple slots; or a slot indicated by the SPS activation signal from among the multiple slots.

12. The base station of claim 10, wherein the HARQ process ID is determined based on information on a first symbol of the first PDSCH reception occurrence, wherein user equipment (UE) capability information indicating that the terminal supports processing of a transport block (TB) transmitted over the multiple slots is received from the terminal, wherein a PDSCH time axis allocation list including information on at least one PDSCH time axis allocation is configured for the terminal via radio resource control (RRC) signaling, wherein a time domain resource allocation (TDRA) field value is included in the SPS activation signal and indicates one PDSCH time axis allocation of the at least one PDSCH time axis allocation, and wherein whether the first PDSCH reception occurrence comprises the multiple slots is identified based on the indicated PDSCH time axis allocation.

* * * * *